US008902204B2

(12) United States Patent
Serikov et al.

(10) Patent No.: US 8,902,204 B2
(45) Date of Patent: Dec. 2, 2014

(54) BOUNDING BOX BASED CONTROL METHOD FOR ELECTRONIC PAPER DEVICES

(75) Inventors: Igor Serikov, Fremont, CA (US); Guotong Feng, San Jose, CA (US); Eric Matthew Hansen, Santa Cruz, CA (US); Michael A. Pogue, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 509 days.

(21) Appl. No.: 13/406,130

(22) Filed: Feb. 27, 2012

(65) Prior Publication Data

US 2013/0106806 A1 May 2, 2013

Related U.S. Application Data

(60) Provisional application No. 61/552,218, filed on Oct. 27, 2011.

(51) Int. Cl.

| | |
|---|---|
| ***G06F 3/038*** | (2013.01) |
| ***G09G 5/00*** | (2006.01) |
| ***G09G 3/34*** | (2006.01) |

(52) U.S. Cl.

CPC ............ *G09G 3/344* (2013.01); *G09G 2310/04* (2013.01)

USPC .......................................................... 345/204

(58) Field of Classification Search

None

See application file for complete search history.

(56) References Cited

U.S. PATENT DOCUMENTS

| | | | | |
|---|---|---|---|---|
| 2008/0309657 | A1* | 12/2008 | Rhodes et al. | 345/214 |
| 2008/0309674 | A1* | 12/2008 | Barrus et al. | 345/545 |
| 2009/0256868 | A1* | 10/2009 | Low et al. | 345/691 |

FOREIGN PATENT DOCUMENTS

| | | |
|---|---|---|
| JP | 2002-245475 | 8/2002 |
| JP | 2009-258735 | 11/2009 |
| JP | 2010-520490 | 6/2010 |
| JP | 2010-237518 | 10/2010 |
| JP | 2011-209326 | 10/2011 |
| JP | 2011-257864 | 12/2011 |

OTHER PUBLICATIONS

International Search Report for PCT/JP212/077820, dated Nov. 27, 2012, 8 pages.

* cited by examiner

*Primary Examiner* — Nicholas Lee

(74) *Attorney, Agent, or Firm* — Patent Law Works LLP

(57) ABSTRACT

A system for updating an electrophoretic display of an electronic paper device (EPD) has a display driving system comprising a display manager, a compositor, a bounding box list producer, a display controller and a memory storing a bounding box list, a transfer matrix buffer, waveforms and subframes. The display driving system receives one or more display requests from one or more input devices and applications. The display driving system transforms the display requests into bounding boxes and transition matrices of pixel values. The display driving system collapses overlapping bounding boxes into non-overlapping bounding boxes. The display driving system generates subframes using the bounding boxes, the transition matrices and waveforms containing voltage information. The subframes are used to drive the electrophoretic display to display an image.

20 Claims, 18 Drawing Sheets

BOUNDING BOX BASED CONTROL METHOD FOR ELECTRONIC PAPER DEVICES

CROSS REFERENCE TO RELATED APPLICATIONS

This application claims priority under 35 USC §119(e) to U.S. Provisional Patent Application No. 61/552,218, entitled "Bounding Box Based Control Method for an Electrophoretic Display," filed Oct. 27, 2011, which is hereby incorporated by reference for all purposes.

BACKGROUND OF THE INVENTION

1. Field of the Art

The present specification generally relates to the field of electronic paper devices. More particularly, the present specification relates to systems and methods for updating electrophoretic displays using bounding box based display driving control.

2. Description of the Related Art

Several technologies have been introduced recently that provide some of the properties of paper in a display device that can be updated electronically. Some of the desirable properties of paper that these types of display devices try to achieve include: low power consumption, flexibility, wide viewing angle, light weight, high resolution, high contrast, and readability indoors and outdoors. Because these display devices attempt to mimic the characteristics of paper, they are referred to as electronic paper devices (EPDs). These display devices are also referred to as: paper-like displays, zero power displays, e-paper displays, bi-stable displays or electrophoretic displays.

A comparison of EPDs to Cathode Ray Tube (CRT) displays or Liquid Crystal Displays (LCDs) reveals that in general, EPDs require less power and have higher spatial resolution; however, many EPDs have lower update rates, less accurate color control and lower color resolution than LCDs or CRTs.

In a conventional LCD, the luminance, or color, of a pixel depends on the voltage applied to the pixel, with a given voltage corresponding to a specific luminance. In contrast, the luminance or color of a pixel in an EPD typically changes based on the duration that voltage is applied to the pixel as well as the voltage value. For example, in some electrophoretic displays, applying a negative voltage to a pixel makes the pixel lighter (i.e., makes the pixel have a higher luminance) and applying a positive voltage makes the pixel darker. The higher the voltage and the longer or more frequently that voltage is applied, the larger the change in luminance. Hence, electrophoretic displays are typically controlled by applying a sequence of voltages to a pixel instead of applying a single voltage to a pixel, like a typical LCD. Often, a sequence of voltages applied to an electrophoretic display pixel is referred to as a "waveform."

Additionally, control signals driving a pixel of an electrophoretic display also depend on the optical state to which the pixel is being driven and on the optical state from which the pixel is being driven. Other factors, such as temperature of the electrophoretic display, optical state of the pixel prior to the current optical state and the time since the pixel was last driven, are also taken into consideration when identifying a waveform to drive a pixel of an electrophoretic display.

Accordingly, conventional controllers for driving an electrophoretic display are often configured like an indexed color-mapped display. For example, a frame buffer of an electrophoretic display includes indices to a waveform used to update an image rather than the waveform itself. When the optical state of a pixel is to be changed, the index of the appropriate waveform is chosen based on one or more factors, such as current pixel state and/or destination pixel state and the pixel's location in the frame buffer is set to the index corresponding to the chosen waveform.

It generally takes longer to apply a waveform to modify a pixel of an electrophoretic display than it does to modify a pixel of a conventional CRT or LCD display. This can lead to noticeable latency between requests to display a new image on an electrophoretic display and when the electrophoretic display displays the new image. For example, an electrophoretic display using a conventional display controller may take 0.5 seconds to update a 1200×825 display. The latency can be reduced by simplifying the waveform calculation, for example by ignoring secondary factors such as dwell time and pixel history (prior displayed colors for the pixel) prior to the current optical state. However, such simplifications to waveform calculation result in remnants of prior displayed images remaining visible, a problem commonly referred to as "ghosting," when the electrophoretic display is modified.

While current update times are generally sufficient for the page turning needed by electronic books, they are problematic for interactive applications such as pen tracking, or soft key typing. A user may tolerate waiting for a second or two for transitioning between two pages when the user spends a few minutes reading each page. However, if a user wants to write or type on a page with instant visual feedback, the increased latency of electrophoretic display update becomes unacceptable.

SUMMARY OF THE INVENTION

The present invention overcomes the deficiencies and limitations of the prior art, at least in part, with a system and a method for updating the electrophoretic display of an electronic paper device (EPD). In one embodiment, the display driving system for updating the electrophoretic display comprises: a display manager, a compositor, a bounding box list producer, a display controller and a memory storing a bounding box list, a transfer matrix buffer, waveforms and subframes. The display driving system receives a display request from an input device, generates bounding boxes and transition matrices and generates a subframe sequence based on the bounding boxes, transition matrices and waveforms. The produced subframes are sent to the display interface to be displayed on the electrophoretic display.

In one embodiment, the method for updating the electrophoretic display of an EPD includes: receiving one or more display requests; transforming the one or more display requests into one or more bounding boxes; generating one or more transition matrices from the one or more bounding boxes; generating a subframe sequence from the one or more bounding boxes and the one or more transition matrices; and providing the subframe sequence to control one or more pixels on the electrophoretic display. The present invention also includes other methods such as using reference buffers and minimizing mutual exclusion between one or more threads that produce the one or more bounding boxes.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the inventive subject matter.

BRIEF DESCRIPTION OF THE DRAWINGS

The specification is illustrated by way of example, and not by way of limitation in the figures of the accompanying drawings in which like reference numerals are used to refer to similar elements.

Figure 1:
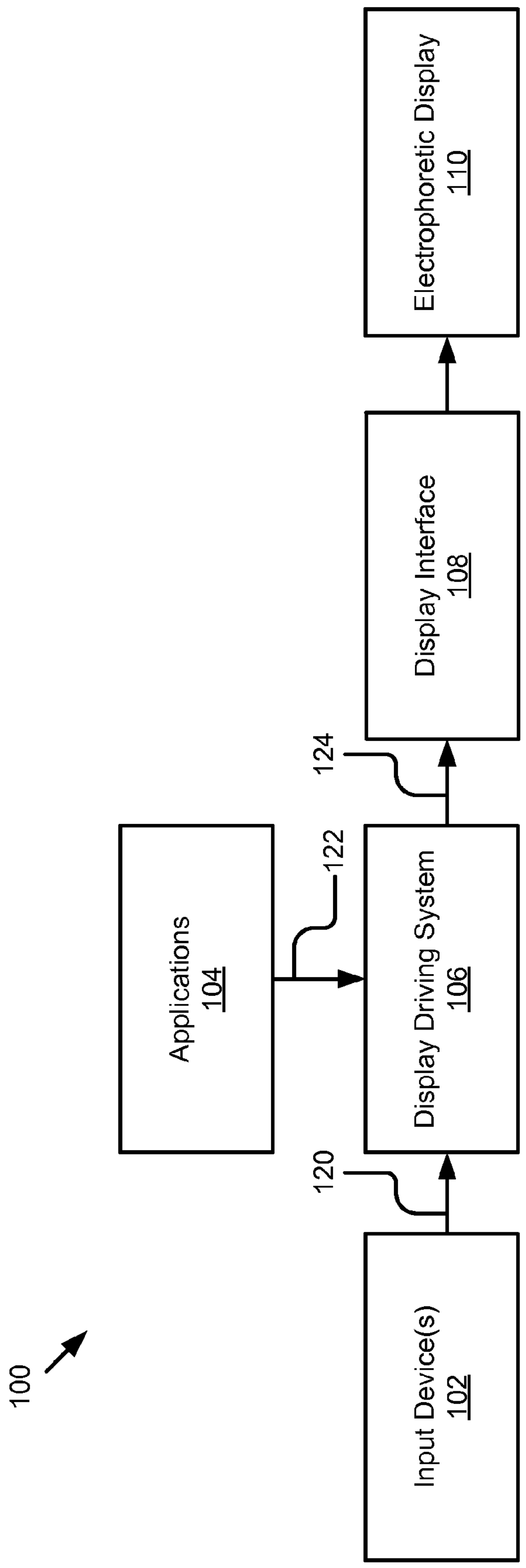
FIG. 1 is a high-level block diagram of one embodiment of a system for controlling an electrophoretic display.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method for controlling an electronic paper device (EPD) are described. In the following description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present invention is described in one embodiment below primarily with reference to user interfaces and particular hardware. However, the present invention applies to any type of computing device that can receive data and commands, and any peripheral devices providing services.

Reference in the specification to “one embodiment” or “an embodiment” means that a particular feature, structure, or characteristic described in connection with the embodiment is included in at least one embodiment of the description. The appearances of the phrase “in one embodiment” in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a high-level block diagram of a system 100 for controlling an EPD according to some examples. In one embodiment, the illustrated description of the system 100 includes: input device(s) 102, applications 104, a display driving system 106, a display interface 108 and an electrophoretic display 110. The input device(s) 102 and applications 104 that provide display requests to a display driving system 106 via signal lines 120 and 122, respectively. The display driving system 106 generates and sends subframes to a display interface 108 via signal line 124. The display interface 108 receives voltage data from the subframes and applies the voltages to the electrophoretic display 110. The electrophoretic display 110 displays images corresponding to the information from the display interface 108.

The input device(s) 102 send one or more display requests to the display driving system 106. The input device(s) 102 are a touch sensor, buttons or any other device that has the ability to send display requests. In one embodiment, the input device (s) 102 include a touch sensor for pen tracking and for erasing one or more pixels on the electrophoretic display 110.

The applications 104 are one or more software programs for sending one or more display requests to the display driving system 106. In one embodiment, the applications 104 send display requests to the display driving system 106 in addition to the information sent by the input device(s) 102. The applications 104 send display requests that include various features such as document loading, region updates, widgets, system status indicators, etc.

The display driving system 106 is software and routines for receiving input from one or more of the input device(s) 102 and the applications 104. The display driving system 106 outputs a sequence of subframes that are sent to the subframe buffer (not shown) where the data is transferred via direct memory access to the display interface 108 and finally displayed on the electrophoretic display 110. The display driving system 106 will be explained in more detail below with reference to FIG. 3.

In one embodiment, the subframe buffer (not shown) stores the subframe sequence in a queue comprising of three buffers. The advantages of using three buffers will be described in more detail in reference to FIGS. 8A-8B. The display interface 108 receives voltage data from memory subframe by subframe by direct memory access. If the direct memory access has started, the direct memory access continues to operate until it is requested to stop delivering a subframe data buffer periodically. While transferring a subframe, the direct memory access generates an interrupt. The display driving system 106 uses this interrupt to supply a subframe buffer filled with the data which is to be transferred by direct memory access after the current subframe transfer is complete. In one embodiment, the display driving system 106 configures the delay between the beginning of the subframe transfer and the interrupt. The access to the subframe buffer by the display interface 108 to transfer subframes is represented by signal line 124.

The display interface 108 is coupled to the output of the display driving system 106 by signal line 124 to receive subframes. In one embodiment, the display interface 108 retrieves the subframes from the subframe buffer. The display interface 108 processes the subframes and applies a voltage corresponding to the subframes to the electrophoretic display 110.

The electrophoretic display 110 receives voltage signals from the display interface 108 and displays an image corresponding to the subframes from the display driving system 106. The electrophoretic display 110 forms an image by applying a sequence of positive and negative voltages to pixels. In one embodiment, the electrophoretic display 110 has a full screen-sized plane of data for every stage in the update sequence.

Figure 2:
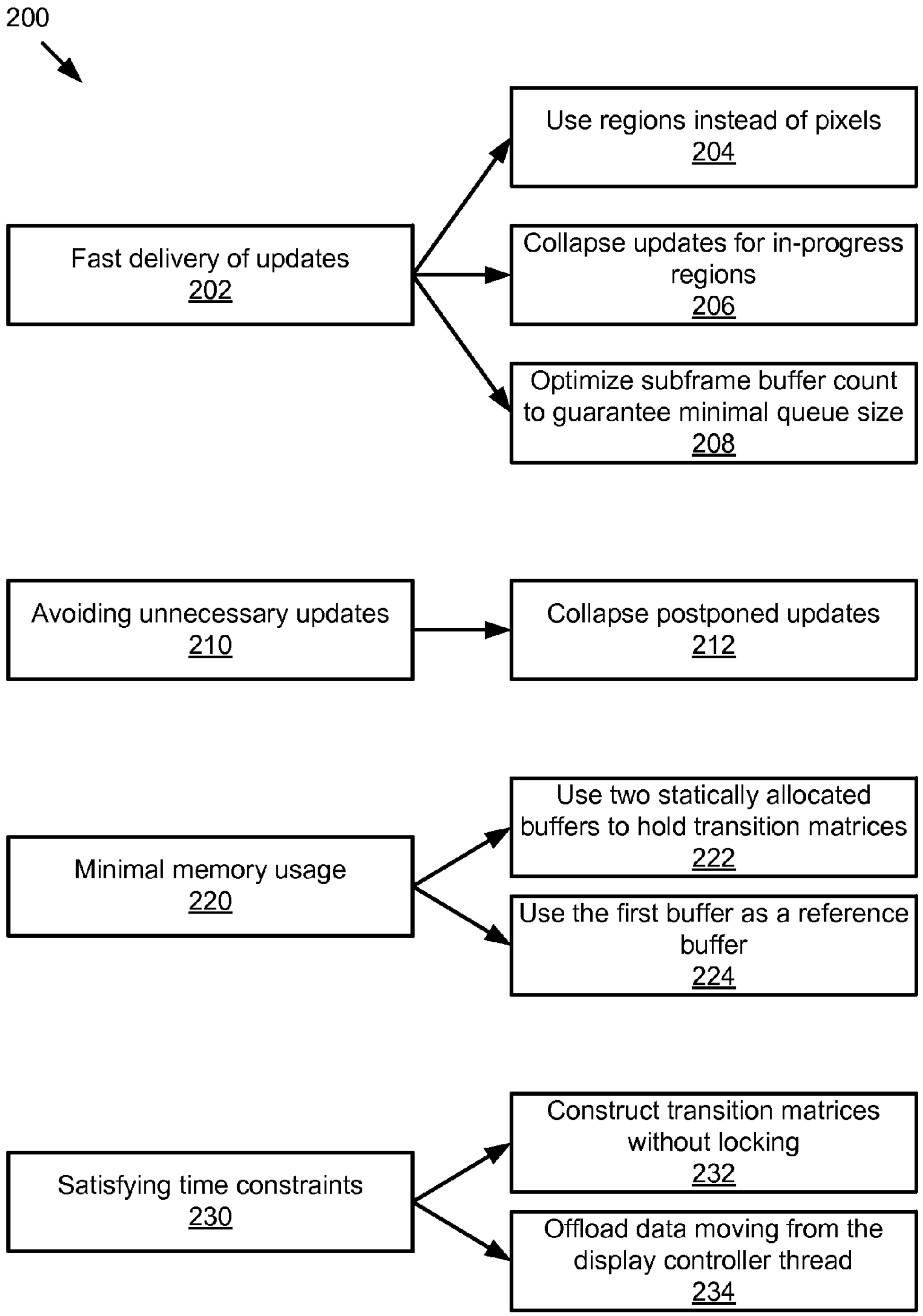
FIG. 2 is a block diagram of goals of an electrophoretic display driving system and one example of the corresponding key methods of such a system.

FIG. 2 is a block diagram of the goals of an electrophoretic display driving system and one example of the corresponding key methods of such a system for controlling an EPD. The goals for controlling an EPD include fast delivery 202 of updates, avoiding 210 unnecessary updates, minimizing 220 memory usage and satisfying 230 time constraints. The fast delivery 202 of updates is achieved by using 204 regions instead of individual pixels, collapsing 206 updates for in-progress regions, and optimizing 208 the subframe buffer count to guarantee minimal queue size. By manipulating 204 regions instead of individual pixels, collapsing 206 updates for regions that are already in progress for display, and reducing 208 the subframe buffer count to three, the method delivers subframe updates to the electrophoretic display 110 with minimal latency. The avoiding 210 unnecessary updates is achieved by collapsing 212 postponed updates into a single update. The 220 minimal memory usage is achieved by using 222 two statically allocated buffers to hold transition matrices and using 224 the first buffer as a reference buffer. Finally, the satisfying 230 time constraints is achieved by constructing 232 transition matrices without locking the bounding box list and offloading 234 data moving from the display controller thread. These components and their operations are described in more detail below with reference to FIGS. 7A-7D.

Figure 3:
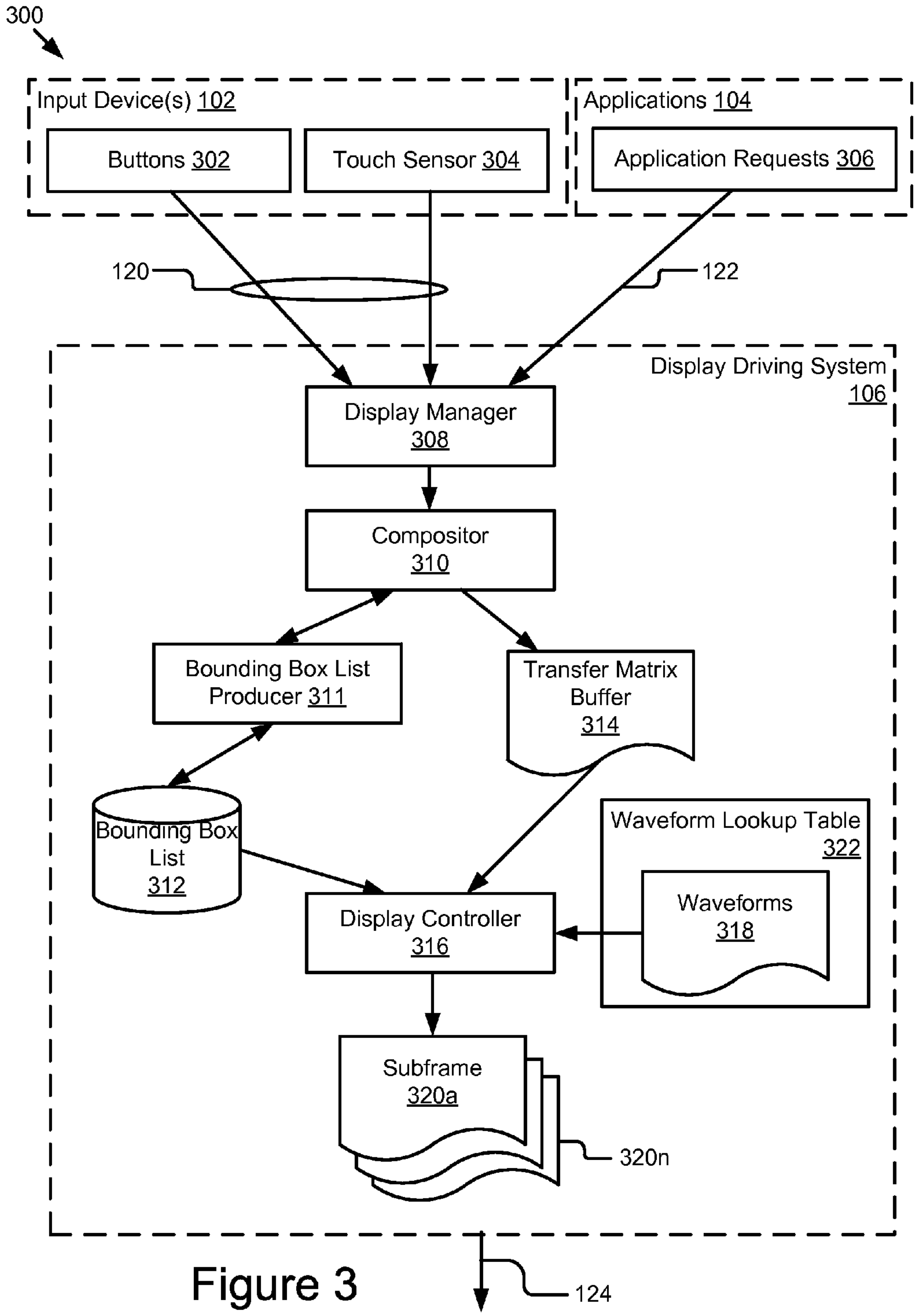
FIG. 3 is a detailed block diagram of one embodiment of components of the system for controlling an electrophoretic display.

Referring now to FIG. 3, an embodiment of a system 300 includes the display driving system 106 and is illustrated in more detail. The system 300 includes the input devices(s) 102, the applications 104 connected via signal lines 120 and 122 to the display driving system 106. In one embodiment, FIG. 3 illustrates a block diagram of a display driving system 106 for receiving display requests from various input device (s) 102 and applications 104 and generating a sequence of subframes 320*a* . . . *n* from the display requests. The subframes 320 are then sent from the display driving system 106 to the display interface 108 via signal line 124. In FIG. 3 and the remaining Figures, a letter after a reference number, such as "320*a*" is a reference to the element having that particular reference number. A reference number in the text without a following letter, such as "320," is a general reference to any, some, or all instances of the elements bearing that reference number.

The input device(s) 102 includes buttons 302 and a touch sensor 304 connected via input lines 120 to the display driving system 106 for sending display requests to the display driving system 106 according to one embodiment. In one embodiment, the buttons 302 and touch sensor 304 send display requests directly to the display manager 308.

The applications 104 may be software programs that include application requests 306 connected via input line 122 to the display driving system 106 for sending display requests to the display driving system 106 according to one embodiment. In one embodiment, the application requests 306 transfer display requests directly to the display manager 308.

The display driving system 106 comprises a display manager 308, a compositor 310, a bounding box list producer 311, a bounding box list 312, a transfer matrix buffer 314, a display controller 316, subframes 320*a* . . . *n* and a waveform lookup table 322 that includes waveforms 318. The display manager 308, the compositor 310, and the bounding box list producer 311 add rectangle regions to a bounding box list 312 and add information about a current image and a next image to the transfer matrix buffer 314. In one embodiment, the rectangle region is any size between a single pixel and the full size of the electrophoretic display 110. The display controller 316 retrieves the waveforms 318 from the waveform lookup table 322. The waveforms 318 include voltage value sequences for driving the electrophoretic display 110. The display controller 316 receives bounding boxes from the bounding box list 312 and transition matrices from the transfer matrix buffer 314. The display controller 316 produces subframes 320 from bounding boxes, transition matrices and waveforms 318 and sends the produced subframes 320 to the subframe buffer.

The display manager 308 receives one or more display requests from buttons 302, touch sensor 304 and application requests 306. The display manager 308 transforms the one or more display requests into one or more rectangular regions which are represented by bounding boxes. In one embodiment, the bounding box has several defining variables including left position, top position, width, height, subframe index number, waveform mode and update in progress. The left position, top position, width and height represent the geometry of the rectangular region to be updated on the display. The subframe index number represents the subframe that is currently being displayed for a particular bounding box. The waveform mode determines the waveform for fast or slow updates. The update in progress describes a current state of transition for the contained pixels and discloses whether or not the pixels are currently being updated on the electrophoretic display 110. The display manager 308 outputs the background image regions, overlay image data, and ink bitmap to the compositor 310.

The compositor 310 receives background image data, overlay image data, and ink bitmap from the display manager 308. The compositor 310 generates one or more transition matrices from the background image data, overlay image data, and ink bitmap received from the display manager 308. The transition matrices include information about a current image and a next image where each byte includes four upper bits and four lower bits representing the next value and the current value in the range of 16 gray levels for each corresponding pixel. The transfer matrix buffer 314 comprises a first buffer and a second buffer for storing one or more transition matrices. The compositor 310 constructs one or more transition matrices in the first buffer and the second buffer of the transfer matrix buffer 314. In some embodiments, the first buffer is used as a reference buffer for storing data to be used by the next display update. The compositor 310 interacts with the bounding box list producer 311 to generate and update the bounding box list 312. In some embodiments, the compositor 310 may be part of the display manager 308.

In one embodiment, the bounding box list producer 311 minimizes mutual exclusion between one or more threads that produce one or more bounding boxes and a thread that consumes the one or more bounding boxes. The bounding box list producer 311 processes the bounding boxes from the display manager 308 while holding a data lock to prevent other threads from manipulating the data, transfers the data without a lock and adds the new rectangle regions to the bounding box list 312 while holding the lock. In another embodiment, the bounding box list producer 311 produces bounding boxes by using temporal clipping between a new bounding box and an existing bounding box in the bounding box list 312. The detail of temporal clipping will be described below with reference to FIGS. 7A-7D.

In another embodiment, the compositor 310 and the bounding box list producer 311 use either the first buffer or the second buffer of the transfer matrix buffer 314 as the reference buffer. This avoids an extra data copy a majority of the time. For example, there are three possible scenarios for processing updates. First scenario: the compositor 310 and the bounding box list producer 311 transfer the new display request for a region to the primary bounding box list, the compositor 310 and the bounding box list producer 311 use the reference buffer for the display request data. Second scenario: the compositor 310 and the bounding box list producer 311 send the new update request to a shadow bounding box list and sends the display request data to the reference buffer. The shadow list will be described in more detail with reference to FIGS. 6A-6B. Third scenario: the compositor 310 and the bounding box list producer 311 send the new update request to a shadow list and send display request data to the second buffer. In one embodiment, the compositor 310 and the bounding box list producer 311 copy display request data to the reference buffer when there is a first shadow region for that primary region. In another embodiment, the compositor 310 and the bounding box list producer 311 copy display request data to the reference buffer when the update of the region is finished. In the latter case, the display controller 316 adds the finished region to a delayed flush queue. The compositor 310 and the bounding box list producer 311 then process the delayed flush queue by copying the display request data to the reference buffer. The method of the compositor 310 and the bounding box list producer 311 will be described in more detail below in reference to FIGS. 7A-7D.

The transfer matrix buffer 314 stores one or more transition matrices. The transition matrices include transition matrix pixels corresponding to pixels on the electrophoretic display 110. The display controller 316 receives various transition matrix pixels of the transition matrices with indices to waveforms 318 from the waveform lookup table 322 required for driving the corresponding display pixels on the electrophoretic display 110 to their desired color. The display driving system 106 outputs the subframes 320 including the indexed waveform data to the subframe buffer, which is accessed by the display interface 108. The subframes 320 are applied to the corresponding display pixel on the electrophoretic display 110 by the display interface 108 to drive the display pixel to its desired color.

The waveforms 318 are stored in a waveform lookup table 322. The waveform lookup table 322 is an indexed storage for waveforms 318 that are required to drive the display pixels on the electrophoretic display 110. In one embodiment, the waveform lookup table 322 is divided into a plurality of time periods represented by subframes 320. A subframe includes a part of the waveform required to drive the display pixel to a desired color. In one embodiment, the waveform lookup table 322 includes waveforms for a subframe sequence. The waveforms 318 include voltage value sequences that will be applied to the electrophoretic display 110. In one embodiment, the waveform lookup table 322 comprises voltage values that are applied to the electrophoretic display 110.

In one embodiment, the waveform lookup table 322 has several variables for obtaining a voltage value for a pixel including mode, temperature, subframe index number, next color and current color. Mode is the waveform mode for whether to support fast or slow updates. Fast updates are used when low latency is preferred over image quality, such as in the case of pen tracking. Slow updates are used when image quality is a priority, such as in the case of an image update. Temperature is the current temperature of the EPD. Subframe index is the index number of the specified subframe in the sequence. Next color is the pixel value of the next image and current color is the pixel value of the current image.

The display controller 316 receives bounding boxes from the bounding box list producer 311, transition matrices from the transfer matrix buffer 314 and waveforms 318 from the waveform lookup table 322. The display controller 316 generates a subframe sequence from one or more bounding boxes from the bounding box list 312, one or more transition matrices from the transfer matrix buffer 314 and waveforms 318 from the waveform lookup table 322. The display controller 316 provides the subframe sequence to control one or more pixels on the electrophoretic display 110.

In one embodiment, the bounding box list producer 311 processes overlapping regions to produce non-overlapped bounding boxes. Naturally, an update request is specified as a rectangle region. The bounding box list producer 311 receives a new region from an update request. The bounding box list producer 311 then uses geometric clipping to detect if the new region and any of the existing regions in the bounding box list are overlapping. If the new region and one existing region are overlapping, then the bounding box list producer 311 determines if the update of the existing region has started being rendered. If the existing region has not started to be rendered on the electrophoretic display 110, then the bounding box list producer 311 breaks the existing region into subregions and excludes the overlapping area of the new region from the subregions of the existing region. Then the bounding box list producer 311 proceeds as if there were no overlap. If the display update of the existing region has already started, the bounding box list producer 311 divides the new region into non-overlapping and overlapping subregions. The non-overlapping subregions are passed to the next iteration of the primary list scanning loop. A primary list is a sequence of regions that is scheduled to be updated or being updated on the electrophoretic display. In one embodiment, a region in a primary list has a shadow list that includes one or more regions within the geometric boundary of the region in the primary list, which are to be rendered immediately after the display update of the region in the primary list is complete.

The overlapping subregions of the new region are geometrically clipped against the shadow list of the existing region. If an overlap is detected between an subregion of the new region and the existing region in the shadow list, then the bounding box list producer 311 breaks the existing region into subregions and excludes the overlapping area of the subregions of the new region from the subregions of the existing region. When the clipping is done, the overlapping subregions of the new region are added to the shadow list of the existing region.

After the bounding box list producer 311 has finished the scan of the primary list, the bounding box list 312 includes a list of subregions of the new region that do not overlap with any existing regions in the primary list. When the data composition for the transfer matrix buffer 314 is complete, these non-overlapping subregions are added to the primary list. The display controller 316 scans the primary list when it needs to produce a new subframe. In one embodiment, the display controller 316 sets the proper variables of the update status for the bounding box of a region in the primary list before processing it for the first time, and increments the subframe index of the region upon producing each subsequent subframe 320, and then removes it from the primary list when the display update of the subframe sequence is finished. Finally, the display controller 316 adds the shadow list of the finished region into the primary list.

In some embodiments, the display controller 316 receives a new subframe every 20 ms. The display controller 316 has the responsibility of creating subframes 320. The display controller 316 uses a high scheduling priority and the interference caused by locking the bounding box list 312 is kept to a minimum.

Figure 4:
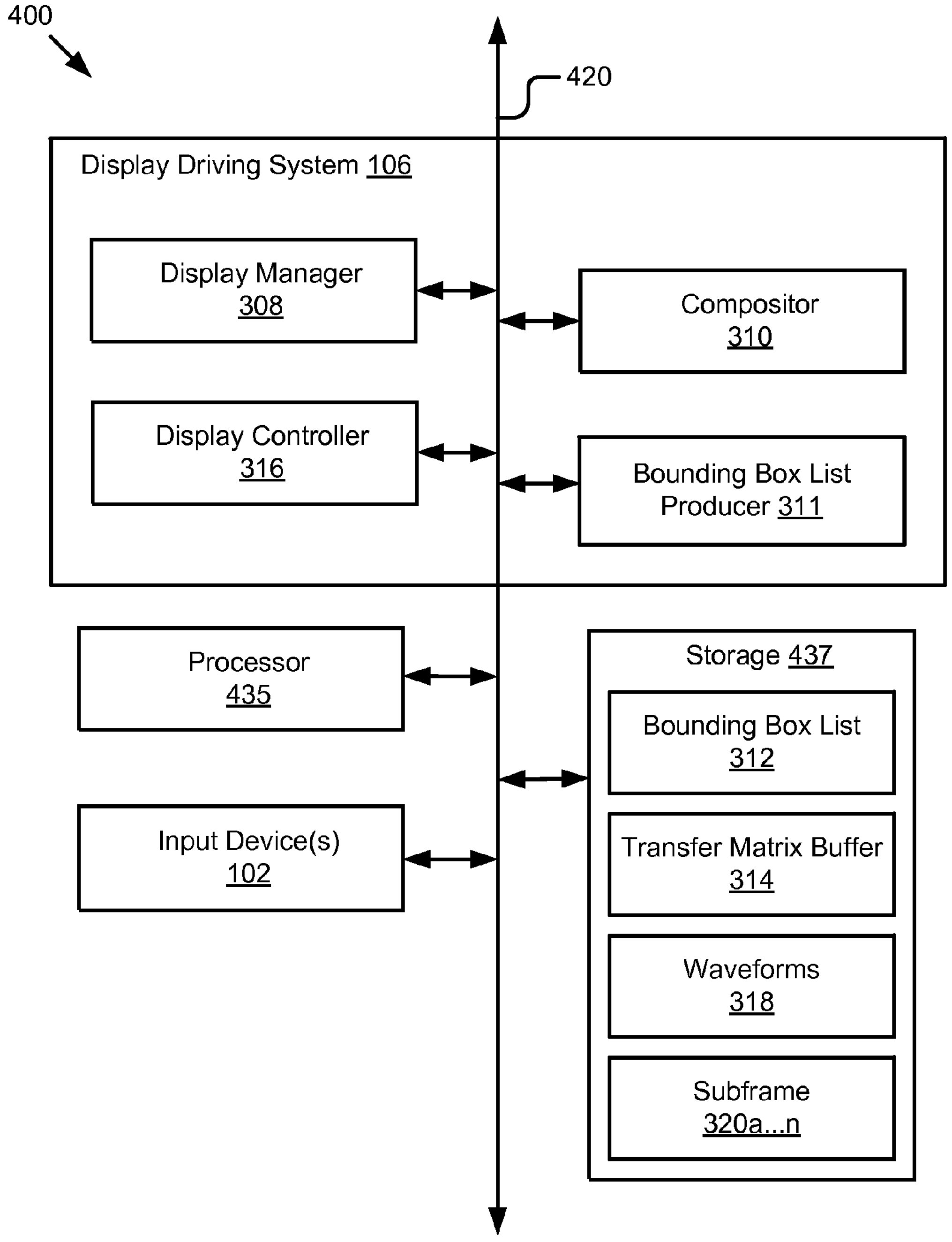
FIG. 4 is a block diagram of another embodiment of a display driving system.

FIG. 4 illustrates a system 400 comprising another embodiment of the display driving system 106. In the system 400 illustrated in FIG. 4, the display driving system 106 is coupled by system bus 420 to a processor 435, storage 437 and the input device(s) 102.

In one embodiment, the display driving system 106 comprises the display manager 308, the compositor 310, the bounding box list producer 311, and the display controller 316. The display manager 308, the compositor 310, the bounding box list producer 311 and the display controller 316 are coupled to each other and other components of the system 400 via the system bus 420. The display manager 308 receives display requests from the input device(s) 102, generates bounding boxes and sends them to the compositor 310 and the bounding box list producer 311. In some embodiments, there is a bounding box list 312 including one or more bounding boxes for a display update. The compositor 310 receives the bounding boxes from the display manager 308 and generates transition matrices. The bounding box list producer 311 adds the bounding boxes to the bounding box list 312. The display controller 316 receives bounding boxes from the bounding box list 312, transition matrices from the transfer matrix buffer 314 and waveforms 318 from the waveform lookup table 322. The display controller 316 generates subframes 320 using the bounding boxes, transfer matrices and waveforms 318 and outputs the subframes 320 to the display interface 108.

The processor 435 comprises an arithmetic logic unit, a microprocessor, a general purpose controller or some other processor array to perform computations and provide electronic display signals to a display device. The processor 435 is coupled to the bus 420 for communication with the other components. The processor 435 processes data signals and may comprise various computing architectures including a complex instruction set computer (CISC) architecture, a reduced instruction set computer (RISC) architecture, or an architecture implementing a combination of instruction set styles. Although only a single processor is shown in FIG. 4, multiple processors may be included.

The storage 437 is a non-transitory memory that stores data necessary for the functionality of the display driving system 106. The storage 437 is communicatively coupled by the system bus 420 for communication with the other components of the computing device 400. In one embodiment, the data stored in the storage 437 includes the bounding box list 312, the transfer matrix buffer 314, the waveforms 318 and the subframes 320.

In one embodiment, the storage 437 stores instructions and/or data that may be executed or used by processor 435. The instructions and/or data may comprise code for performing any and/or all of the techniques described herein. The storage 437 may be a dynamic random access memory (DRAM) device, a static random access memory (SRAM) device, flash memory or some other memory device. In one embodiment, the storage 437 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

Method for Controlling an Electrophoretic Display

Figure 5:
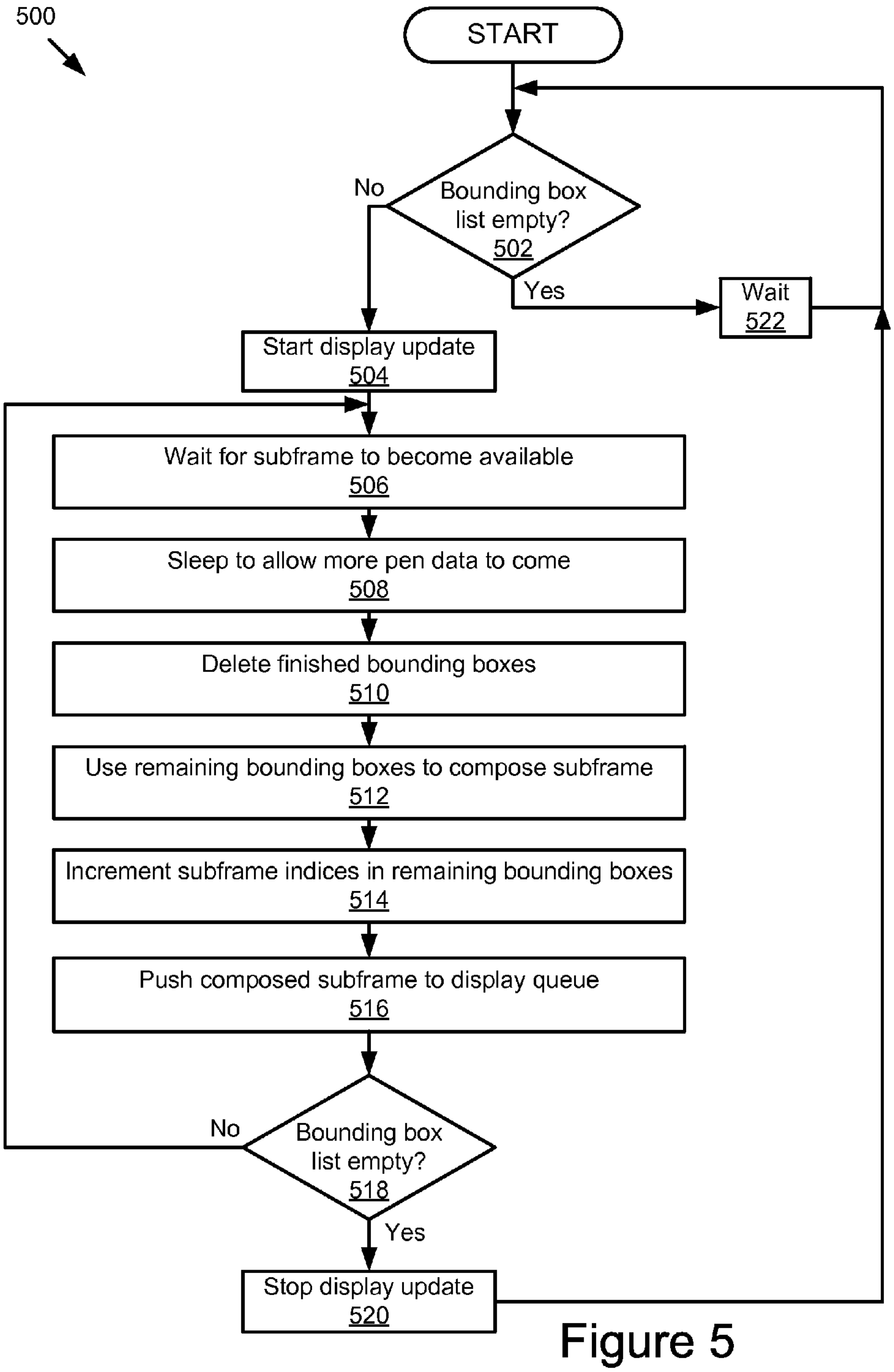
FIG. 5 is a flow chart of one embodiment of a method for processing a bounding box list and composing subframes.

FIG. 5 is a flow chart of one embodiment of a method 500 for processing the bounding box list 312. For example, the display controller 316 is a single thread that runs a loop processing the bounding box list 312 and generating subframes 320. The method 500 or display controller 316 begins by determining 502 if the bounding box list 312 is empty. If the bounding box list 312 is empty, the display controller 316 waits 522 for a signal from the bounding box list producer 311 indicating that the bounding box list 312 becomes non-empty. When the display controller 316 receives the signal, it returns to step 502 to check if the bounding box list 312 is empty. If the bounding box list 312 is not empty, the display controller 316 transitions to step 504 and starts the display update by enabling display power and clocks. The display controller 316 waits 506 for a subframe to become available. Next the display controller 316 sleeps 508 a predetermined amount of time to allow more pen data to be collected. After waking up, the display controller 316 deletes 510 the bounding box that has already been rendered in the last update, uses 512 the remaining bounding boxes to create one or more subframes 320 and increments 514 the subframe index numbers in the remaining bounding boxes to proceed with creating the next set of subframes. Then the display controller 316 pushes 516 the created subframe 320 to a display queue to be rendered on the electrophoretic display. The display controller 316 determines 518 if the bounding box list 312 is empty. If the bounding box list 312 is not empty (i.e., there are still bounding box regions in the middle of the display update) the display controller 316 repeats steps 506-516 until the bounding box list 312 is empty. If the bounding box list 312 is empty, the display controller 316 stops 520 the display update by turning off the display power and clocks and returns to step 502 and waits 522 for the bounding box list 312 to obtain another bounding box. This processes bounding boxes as they are provided to the system and generates subframes using the bounding boxes.

An update for a pixel does not happen instantly. This creates a problem of processing display requests for a pixel currently being rendered on the electrophoretic display 110. To solve this, the compositor 310 and bounding box list producer 311 uses two data buffers. Whenever one data buffer includes the data corresponding to the current frame being updated, the other one is used to record the next operation for that pixel. When the compositor 310 has a subsequent display request for the pixel the compositor 310 replaces the data into the opposite buffer. This collapsing allows the compositor 310 to use two buffers, and reduces the number of subframes the electrophoretic display 110 must render. To speed up scheduling updates and forming subframes, the compositor 310 and the bounding box list producer 311 processes pixels in rectangle regions. The bounding box list producer 311 maintains the primary list of rectangle regions scheduled for update or being updated. In one embodiment, regions in the primary list include a shadow list of subregions that will be added to the primary list immediately after the update of the primary region is complete. A shadow list includes regions contained within the geometric boundary of a region in the primary list.

Figure 6A:
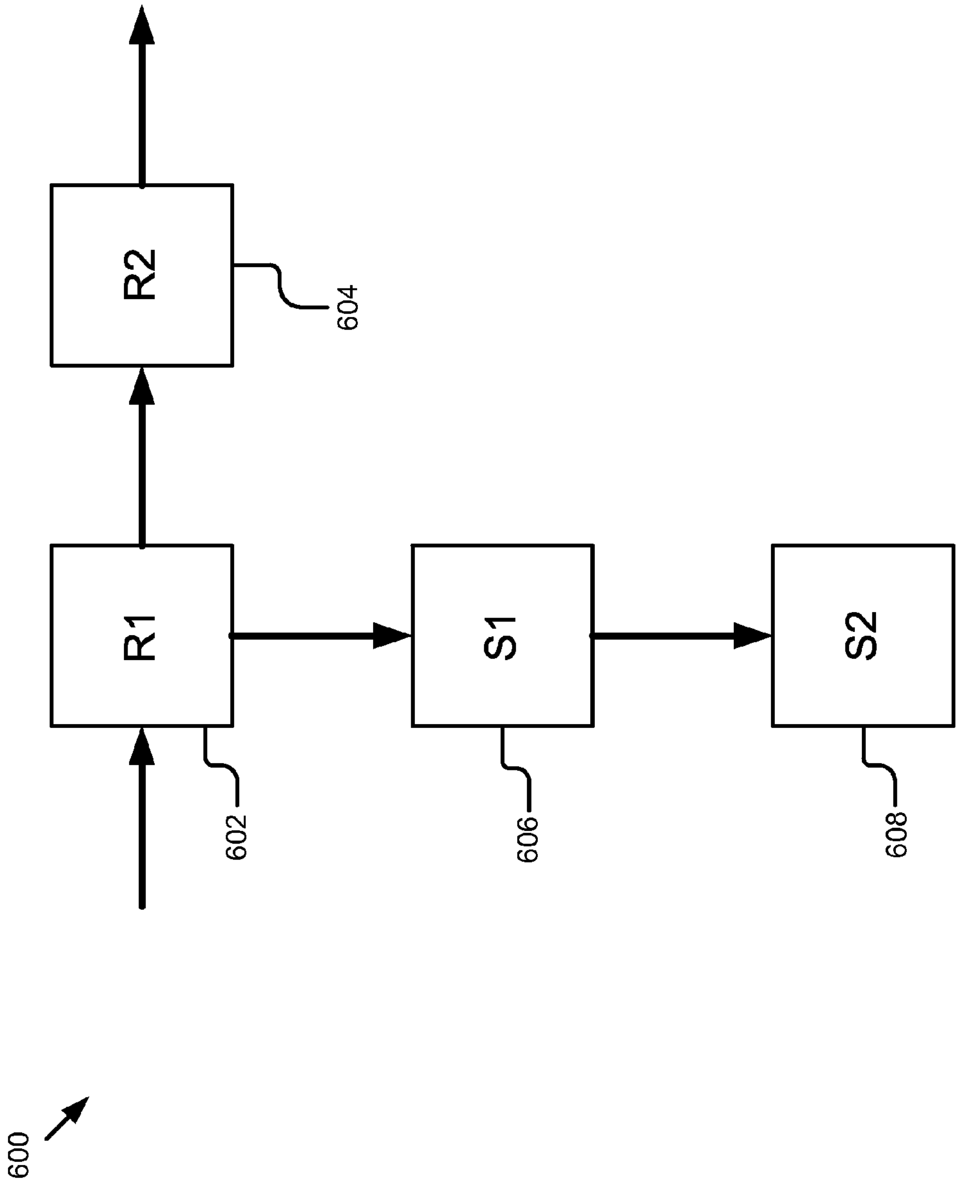
FIG. 6A is a graphical representation of one example of a data structure for the bounding boxes of a primary list and a shadow list.

FIG. 6A is a graphical representation 600 of one embodiment for the data structure of a primary list and a shadow list of bounding boxes. The bounding box list producer 311 creates and maintains a primary list of rectangle regions scheduled for update. The primary list is represented by the horizontal arrows and regions R1 602 and R2 604. Shadow regions S1 606 and S2 608 are two regions in the shadow list of R1 602. In one embodiment, each region in the primary list has a shadow list of one or more shadow regions. The shadow regions of the primary region are updated immediately after the primary region is updated. In one embodiment, the element R1 602 in the primary list is updated and the shadow list associated with the primary element R1 602 is immediately updated after R1 602 is updated.

Figure 6B:
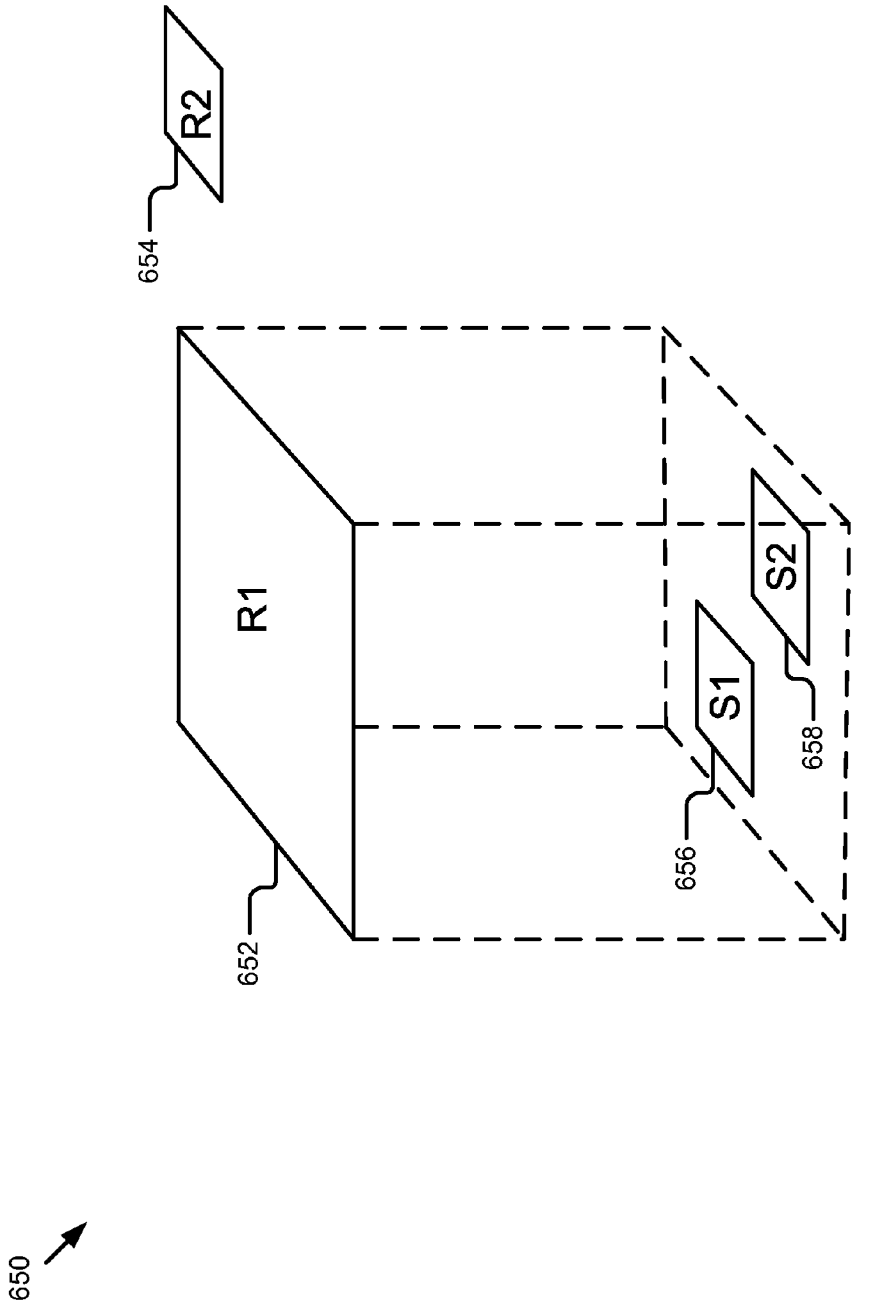
FIG. 6B is a graphical representation of one example of the geometric relationship between the bounding boxes of a primary list and a shadow list.

FIG. 6B is a graphical representation 650 of one embodiment of a geometric relationship between the bounding boxes of primary list and a shadow list. The process of scheduling updates is sped up by performing actions on rectangle regions instead of individual pixels. The shadow regions are included within the geometric boundary of a rectangle region in the primary list. For example, a shadow list including S1 656 and S2 658 is included within the geometric boundary of region R1 652. Region R1 652 and region R2 654 are two separate rectangle regions in the primary list. In one embodiment, a rectangle region in the primary list, such as region R2 654, does not have an associated shadow list.

Referring now to FIGS. 7A-7D, one embodiment of a method 700 of updating a region to be displayed using the bounding box producer 311 will be described in more detail. The bounding box list producer 311 begins by setting up 702 two intermediate lists for bounding box producing: the scheduled list is set to empty and the temporary list is set to include a single bounding box representing the requested region. The scheduled list includes bounding boxes that need to be passed to compositor 310 and then added to the primary or shadow list. The temporary list stores bounding boxes during the process of scanning the primary list. The bounding box list producer 311 then locks 704 the bounding box list 312 to prevent it from being modified. The bounding box list producer 311 determines 706 if the flush list is empty. If the flush list is not empty then the bounding box list producer 311 deletes 716 the first element, unlocks 718 the flush list and then determines 720 if the bounding box list 312 needs to be flushed. If the bounding box list 312 does not need to be flushed, the bounding box list producer 311 returns to step 704. If the bounding box list 312 does need to be flushed then the bounding box list producer 311 copies 722 the data to the reference buffer.

If the flush list is empty as determined in step 706, bounding box list producer 311 starts 708 from the beginning of the bounding box list 312. The bounding box list producer 311 determines 710 if the bounding box list producer 311 is at the end of the bounding box list 312.

Figure 7A:
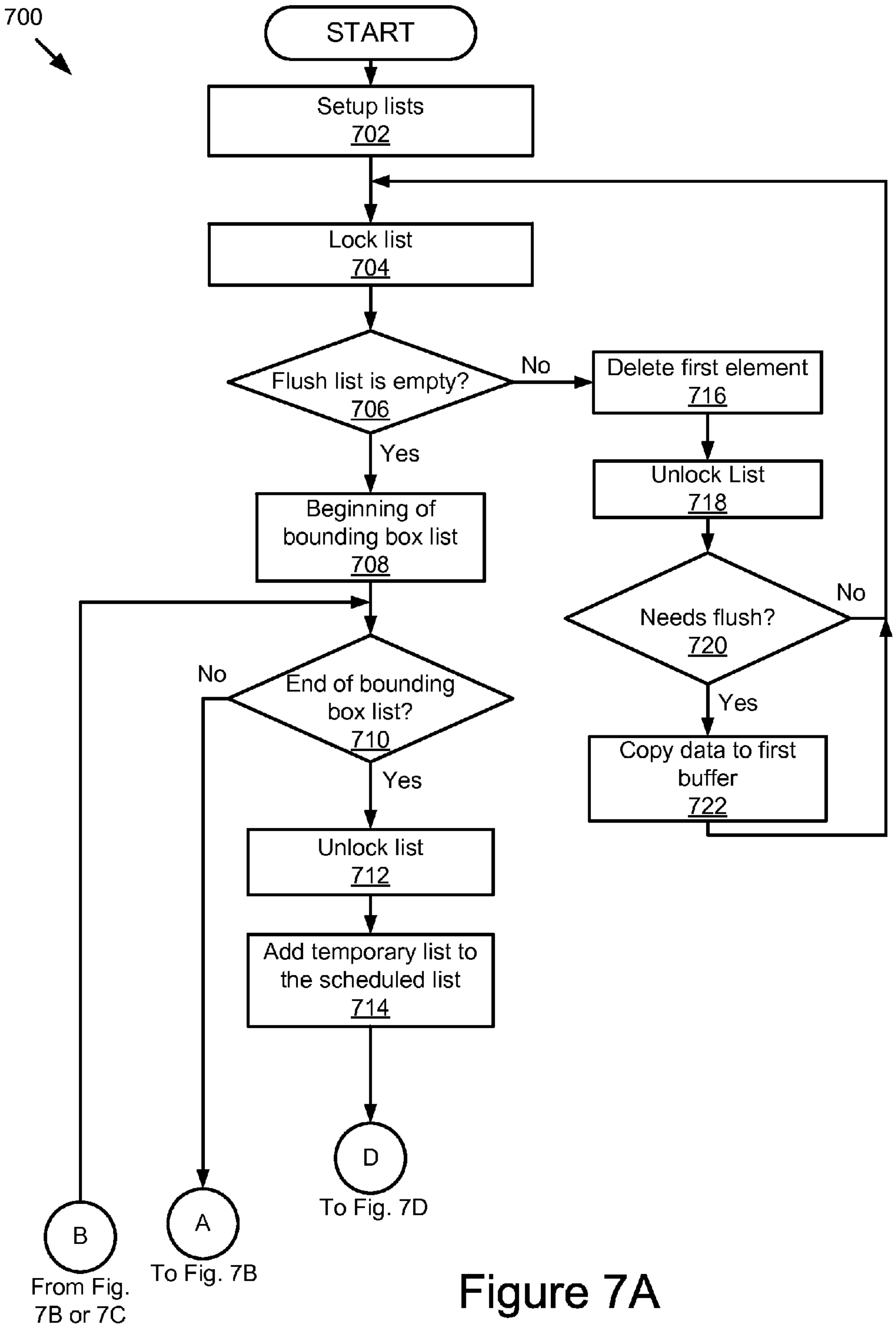
FIGS. 7A-7D are a flow chart of one embodiment of a method for updating a region to be displayed.
Figure 7B:
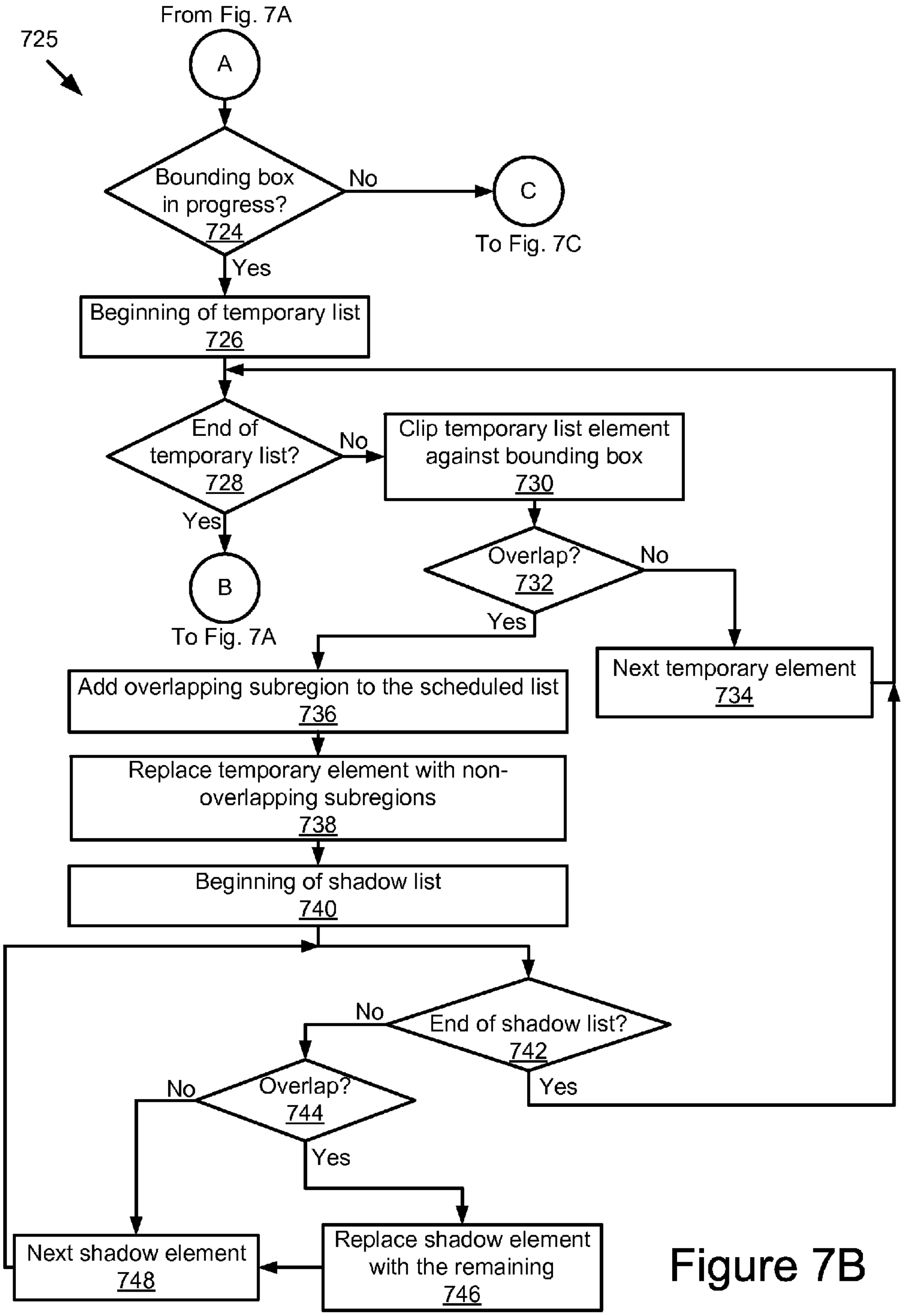

If the bounding box list producer 311 determines in step 710 of FIG. 7A that the end of the bounding box list 312 was not reached, the method 700 continues in step 724 of FIG. 7B. In step 724, the method 700 determines if the display update for the bounding box is in progress. If the bounding box display update is in progress then the bounding box list producer 311 begins processing 726 the temporary list. The bounding box list producer 311 then determines 728 if the bounding box list producer 311 is at the end of the temporary list. If the bounding box list producer 311 is at the end of the temporary list, the bounding box list producer 311 returns to step 710 of FIG. 7A. If the bounding box list producer 311 is not at the end of the temporary list then the bounding box list producer 311 clips 730 the temporary list element against the bounding box. The bounding box list producer 311 then determines 732 if the temporary element and the bounding box overlap. If the temporary element and the bounding box do not overlap, then the bounding box list producer 311 retrieves 734 the next temporary element and returns to step 728. If the temporary element and the bounding box do overlap, then the bounding box list producer 311 adds 736 the overlapping subregion to the scheduled list, replaces 738 the temporary element with the non-overlapping subregions and begins processing 740 the shadow list. The scheduled list may include one or more bounding boxes of regions, a shadow element or a temporary element. The bounding box list producer 311 determines 742 if the bounding box list producer 311 has reached the end of the shadow list. If so, then the bounding box list producer 311 returns to step 728. If not, the bounding box list producer 311 determines 744 if the shadow element and the bounding box are overlapping. If the shadow element and the bounding box are overlapping, then the bounding box list producer 311 replaces 746 the shadow element with its remaining portion, retrieves 748 the next shadow element and returns to step 742. If the shadow element and the bounding box do not overlap, then the bounding box list producer 311 retrieves 748 the next shadow element and returns to step 742.

Figure 7C:
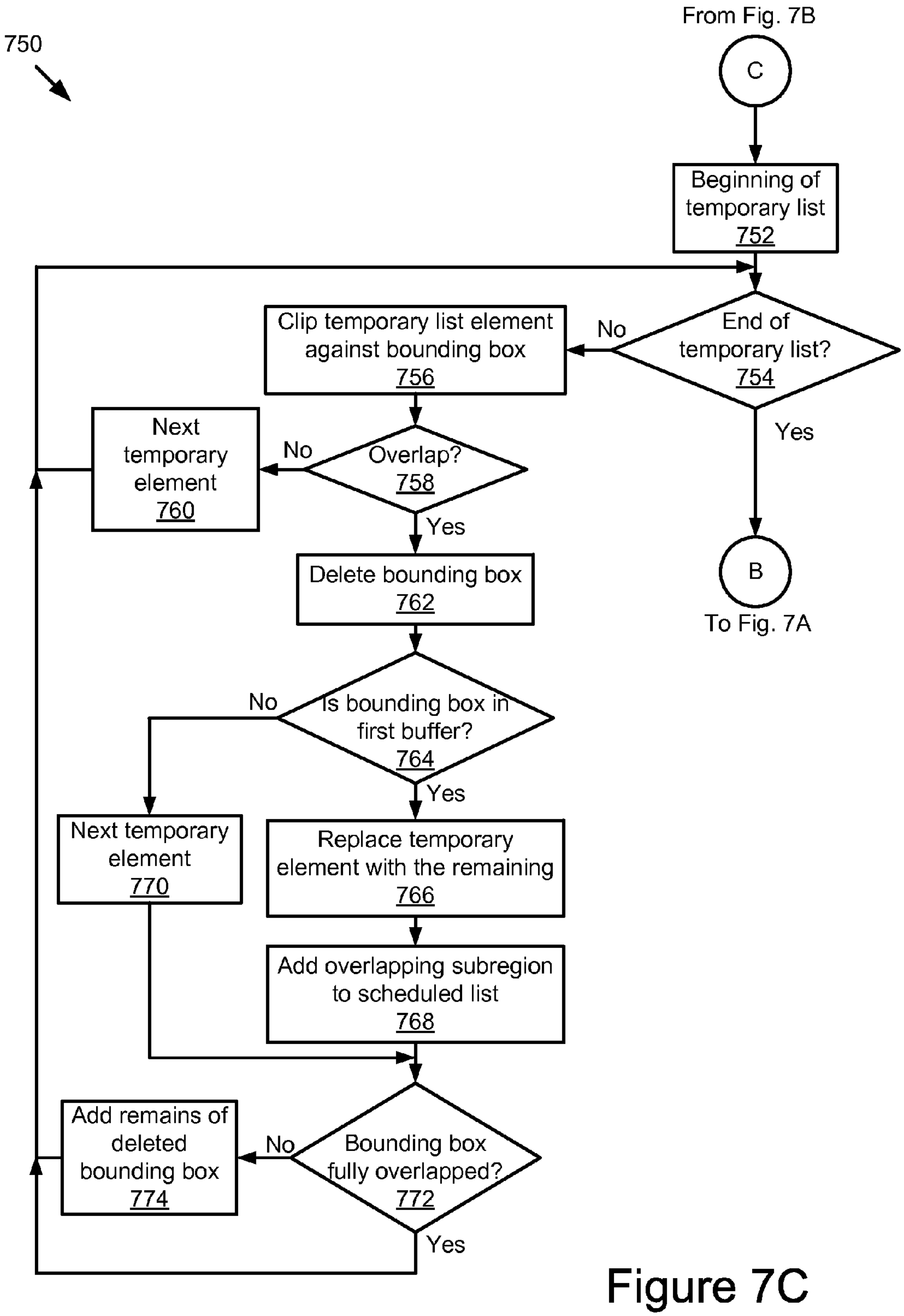
Figure 7D:
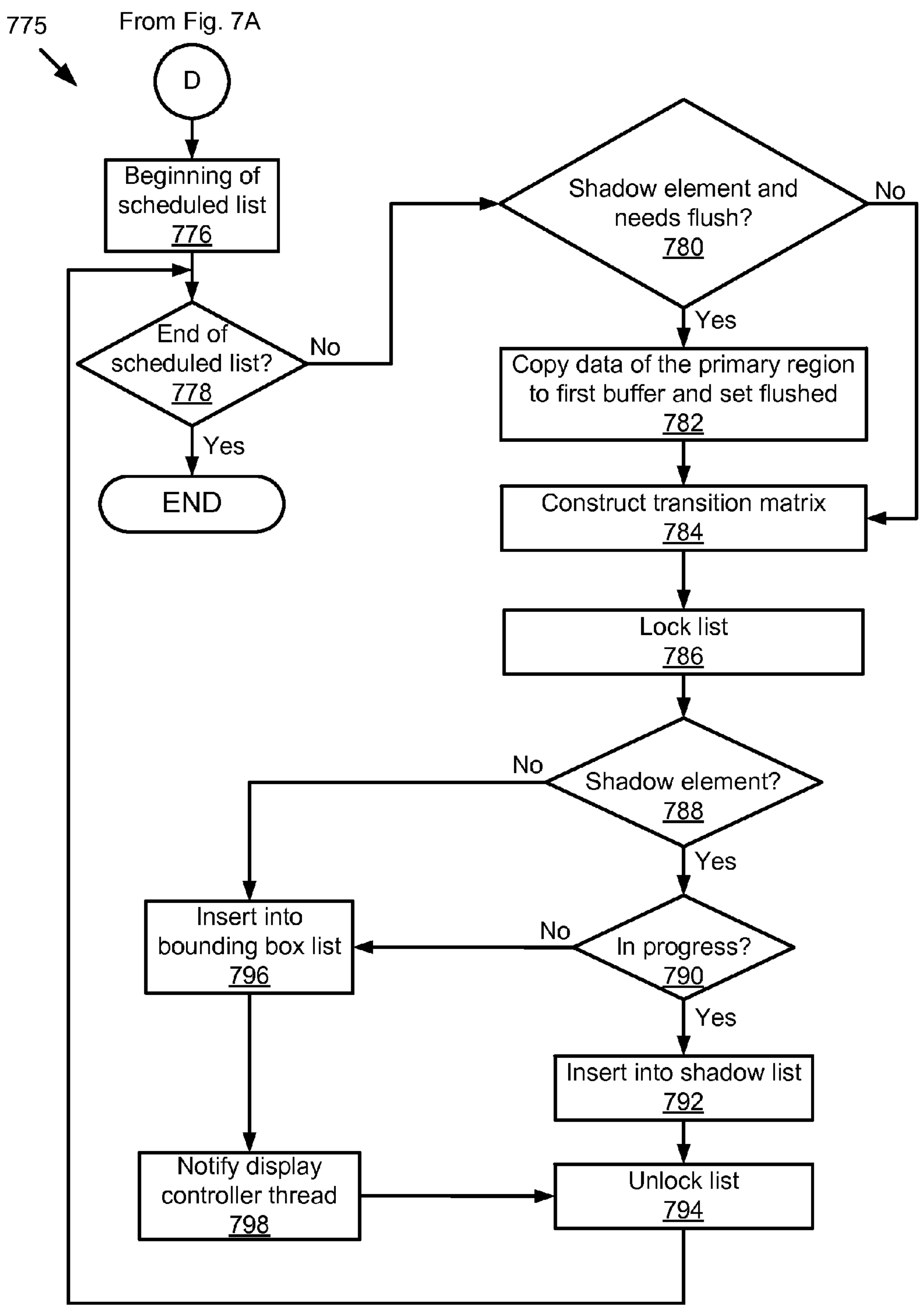

If in step 724 of FIG. 7B the bounding box update is not in progress, then the method 700 proceeds to step 752 of FIG. 7C. In step 752, the bounding box list producer 311 begins processing the temporary list. Then, the bounding box list producer 311 determines 754 if the compositor 310 has reached the end of the temporary list (e.g., there are no unprocessed temporary elements). If the bounding box list producer 311 has reached the end of the temporary list, the bounding box list producer 311 returns to step 710 of FIG. 7A. If the bounding box list producer 311 has not reached the end of the temporary list, the bounding box list producer 311 clips 756 the temporary element against the bounding box. The bounding box list producer 311 determines 758 if the temporary element and the bounding box overlap. If the temporary element and the bounding box do not overlap, then the bounding box list producer 311 retrieves 760 the next temporary element and returns to step 754. If the temporary element and the bounding box do overlap, then the bounding box list producer 311 deletes 762 the finished bounding box of the last update. The bounding box list producer 311 then determines 764 if the bounding box is in the first buffer. If the bounding box is not in the first buffer, then the bounding box list producer 311 retrieves 770 the next temporary element and then continues to step 722. If the bounding box is in the first buffer, then the bounding box list producer 311 replaces 766 the temporary element with the remaining portion of the bounding box, adds 768 the overlapping subregion to the scheduled list and proceeds to step 772. In step 772, the method 700 determines whether the bounding box is fully overlapped by the temporary element. If the bounding box is fully overlapped by the temporary element, then the bounding box list producer 311 returns to step 754. If the bounding box is not fully overlapped by the temporary element, then the bounding box list producer 311 adds 774 the remains of the deleted bounding box to the scheduled list and returns to step 754.

Referring back to FIG. 7A, if the bounding box list producer 311 determines that the end of the bounding box list 312 has been reached, then the bounding box list producer 311 unlocks 712 the bounding box list 312 and adds 714 the temporary list to the scheduled list. Then the method 700 transitions from step 714 of FIG. 7A to step 776 of FIG. 7D. The bounding box list producer 311 begins processing 776 the scheduled list. The bounding box list producer 311 determines 778 if the bounding box list producer 311 has reached the end of the scheduled list. If so, the method is complete and ends. If not, the method 700 determines 780 if the scheduled bounding box is a shadow bounding box that is on the list of primary bounding boxes that needs to be flushed. If so, then the bounding box list producer 311 copies 782 the data of the primary region to the reference buffer and sets it as flushed. Then the bounding box list producer 311 calls the compositor 310 to construct 784 a transition matrix. If the scheduled element is not a shadow element or does not need to be flushed, then the bounding box list producer 311 proceeds immediately to step 784. Next, the bounding box list producer 311 locks 786 the bounding box list 312 to prevent modification. Then the bounding box list producer 311 determines 788 if the scheduled element is a shadow element. If the scheduled element is not a shadow element, then the bounding box list producer 311 inserts 796 the scheduled element into the bounding box list 312, notifies 798 the display controller 316 that the bounding box list 312 includes a new bounding box, unlocks 794 the bounding box list 312 and returns to step 778. If in step 788 the scheduled element is determined to be a shadow element, then the bounding box list producer 311 determines 790 if the bounding box update is in progress. If the bounding box update is not in progress, then the bounding box list producer 311 inserts 796 the scheduled element into the bounding box list 312, notifies 798 the display controller 316, unlocks 794 the bounding box list 312 and returns to step 778. If the bounding box update is in progress then the bounding box list producer 311 inserts 792 the scheduled element into the bounding box list 312, unlocks 794 the bounding box list 312 and returns to step 778. If the bounding box list producer 311 has reached the end of the scheduled list, the method terminates.

Figure 8A:
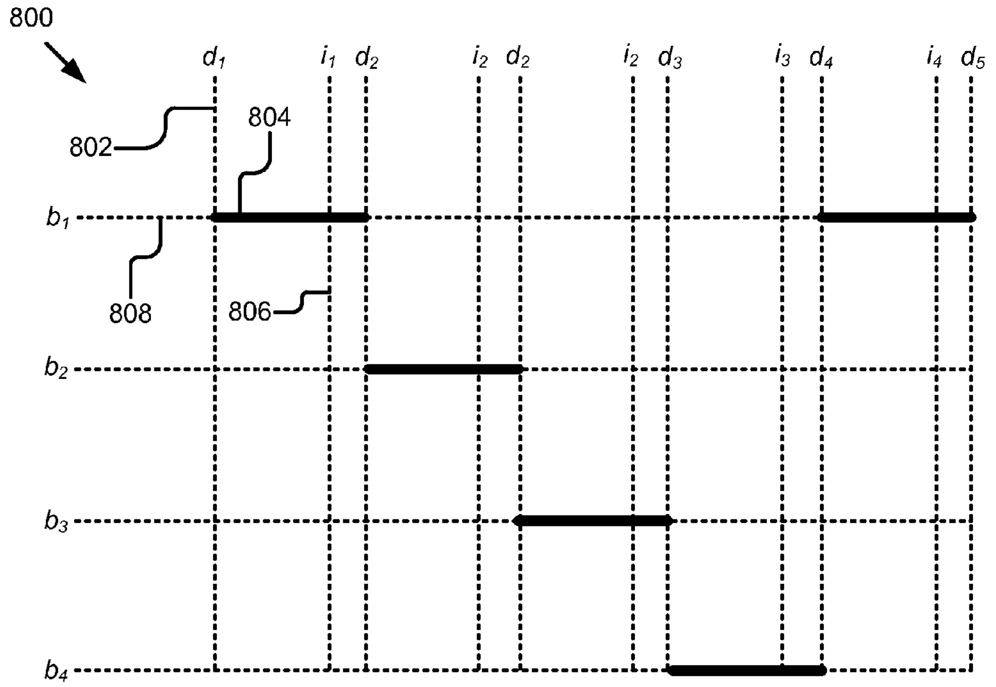
FIG. 8A is a timing diagram of one example of a subframe buffer scheme with four buffers.

Referring now to FIG. 8A, one embodiment of a display driving scheme with four subframe buffers used by the methods described above is shown. The $b_x$ dashed lines 808 represent subframe buffers. The $d_x$ dashed lines 802 represent buffer swap times. The $i_x$ dashed lines 806 represent interrupt times. The solid lines 804 are subframe buffers that are being scanned by the direct memory access. In one embodiment, the interrupt at time $i_1$ frees the subframe buffer at $b_4$, at that moment the display controller 316 has subframe buffer $b_3$. If the display controller 316 quickly fills buffers $b_3$ and $b_4$ and queues them for processing, some display update latency occurs. For example, many outputs will have to wait for two subframe processing times to get picked up by the direct memory access controller.

Figure 8B:
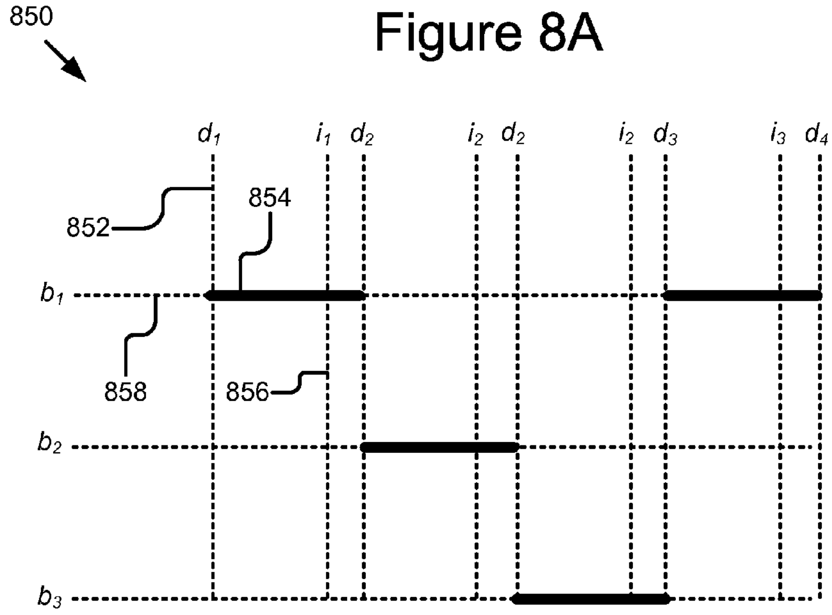
FIG. 8B is a timing diagram of one example of a subframe buffer scheme with three buffers.

Referring now to FIG. 8B, one embodiment of a display driving scheme 850 with three subframe buffers used by the methods described above is shown. The $b_x$ dashed lines 858 represent subframe buffers. The $d_x$ dashed lines 852 represent buffer swap times. The $i_x$ dashed lines 856 represent interrupt times. The solid lines 854 are subframe buffers that are being scanned by the direct memory access. In FIG. 8B the interrupt at time $i_1$ frees subframe buffer $b_3$ which is the same buffer that will be scanned next by the direct memory access. In one embodiment, three subframe buffers are accessed by the display interface 108. The use of three subframe buffers reduces display update latency while allowing the direct memory access to retrieve data efficiently.

Vector-Based Pen Drawing System

Figure 9A:
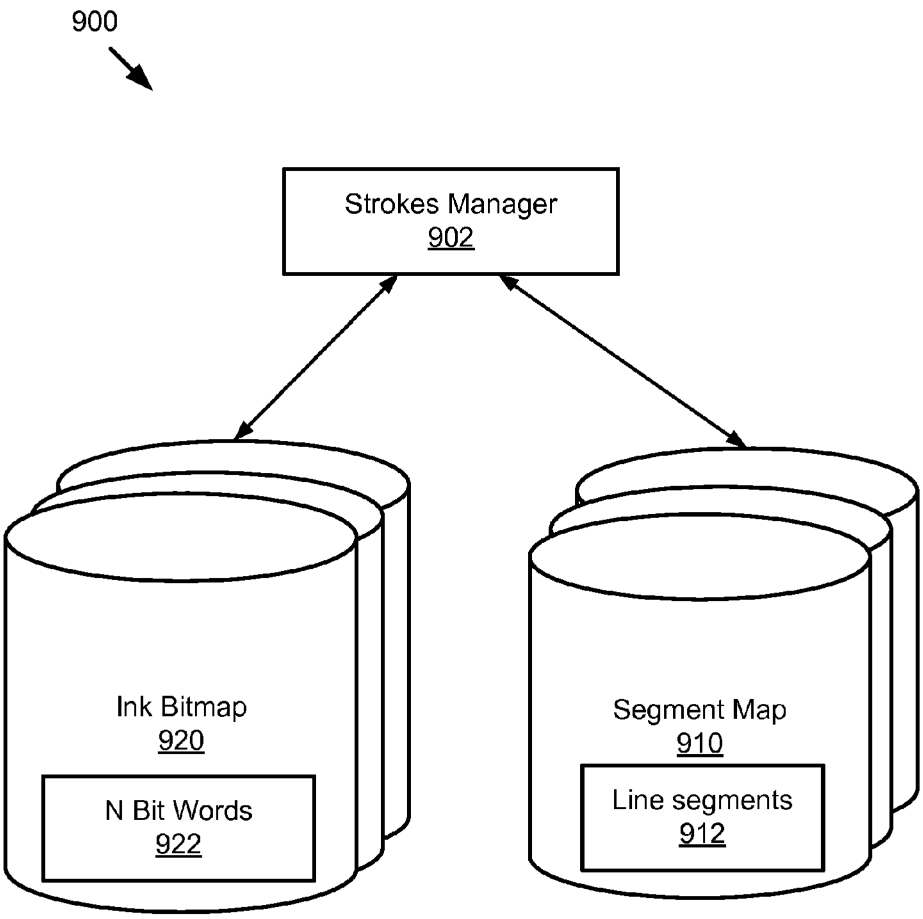
FIG. 9A is a high-level block diagram of one embodiment of a vector-based pen drawing system.

FIG. 9A is a high-level block diagram of one embodiment of a system 900 for vector-based pen drawings. In one embodiment, the strokes manager 902 receives a stroke collection, for example, a sequence of pen samples. In one embodiment, a pen sample is a record including the x and y position of the pen touch, a time stamp and width of the line of each pen sample. The strokes manager 902 adds the received pen strokes to a segment map 910 which is a two-dimensional array corresponding to the display panel. Each element of the array includes a list of line segments 912 that cross the corresponding cell. The line segments 912 are represented by a starting x and y position, an ending x and y position and a line width. The strokes manager 902 uses the line segments 912 to generate n bit words 922 and stores them in an ink bitmap 920. The ink bitmap 920 is an array that stores the n bit words 922. Thus every bit in the n bit words 922 represents a subpixel of the ink bitmap 920. In one embodiment, during the display update the strokes manager 902 converts each n bit word 922 into a bit count value and combines it with the background pixel value to get the desired color value. This produces an anti-aliased image on the display.

After the strokes manager 902 receives a pen sample, the strokes manager 902 adds the pen sample to the strokes collection 902. In one embodiment, the strokes manager 902 signals that the pen stroke is new. If the pen stroke is new, then there are no additional calculations necessary. If the pen stroke is not new, then the strokes manager 902 combines the received sample with the preceding sample to obtain the line segment 912 starting x and y position, an ending x and y position and a desired line width. The strokes manager 902 calculates the line segment 912 geometry as a convex quadrilateral. The strokes manager 902 then adds the line segment 912 to every list of the segment map 910 that corresponds to the cell it covers. Then the strokes manager 902 calculates the smallest rectangle with edges parallel to the axes that includes the line segment 912 and passes this rectangle for further processing by the display update.

In one embodiment, the strokes manager 902 may also receive an eraser sample. Every eraser sample includes the following parameters: an x and y position, desired eraser width. If the eraser sample is the beginning of a new erasure stroke, then there are no additional calculations. Otherwise, the strokes manager 902 combines the received sample with the preceding one to get erasure segment parameters and then the segment geometry. The strokes manager 902 detects which cells are intersected by the erasure segment. For every intersected cell, the strokes manager 902 consults the segment map 910 to find which line segments 912 are near the erasure segment and needs to be examined for intersection. The strokes manager 902 checks if each line segment 912 intersects the erasure segment and erases the line segments 912 that do intersect. The strokes manager 902 erases the line segments 912 and deletes the corresponding samples from the strokes collection. For every erasure segment, the strokes manager 902 calculates the set of line segments 912 that it crosses and redraws them. Finally, the strokes manager 902 derives a rectangle with edges parallel to the axes that include line segments 912 the strokes manager 902 erased and passes this rectangle for further processing by the display update. In one embodiment, the strokes manager 902 reads stroke information from a file.

Figure 9B:
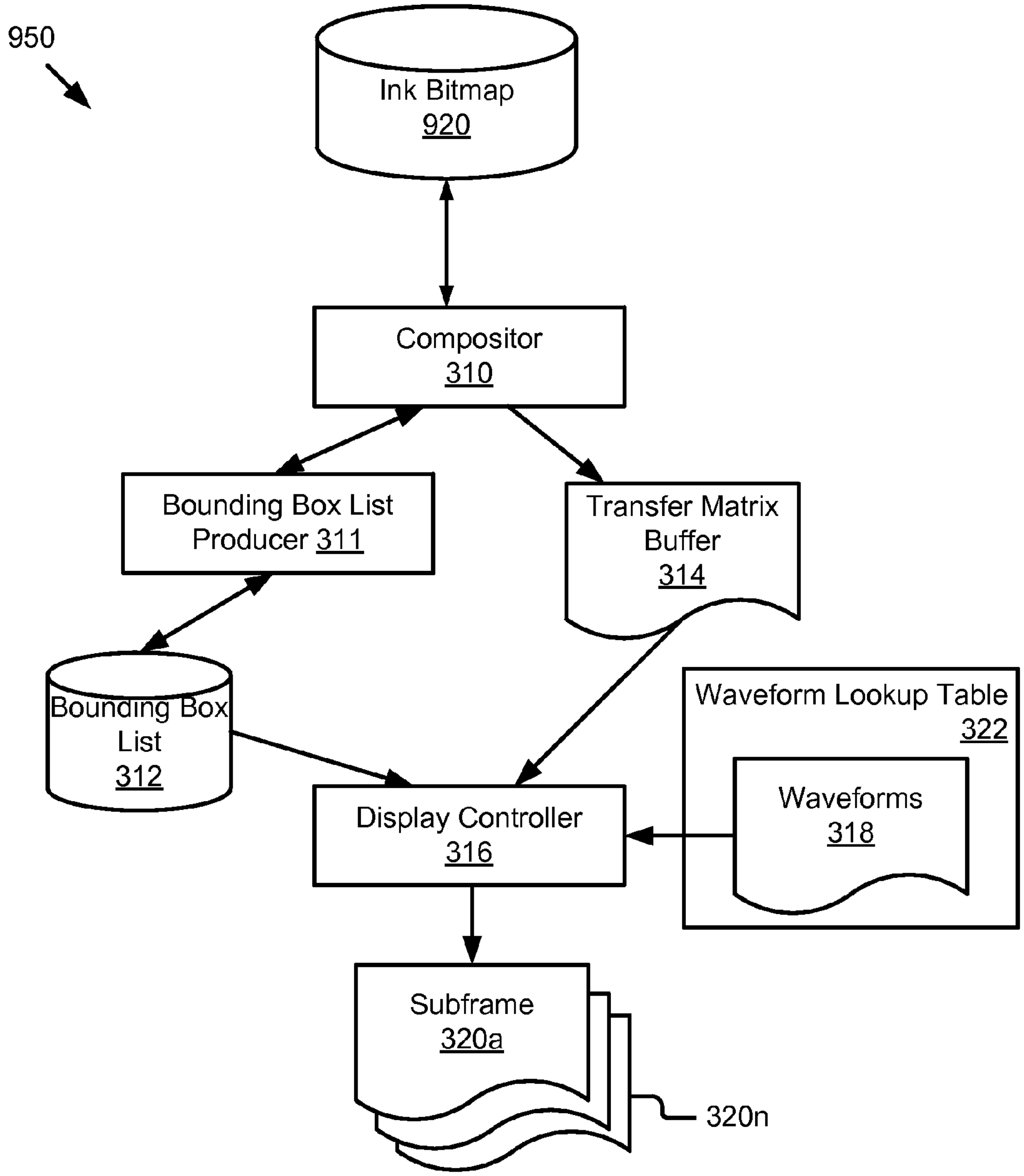
FIG. 9B is a block diagram of one embodiment of a display driving system rendering pen drawings on an electrophoretic display.

FIG. 9B is a block diagram of one embodiment of a display driving system 950 rendering pen drawings on an electrophoretic display. The system 950 comprises an ink bitmap 920, a compositor 310, a bounding box list producer 311, a bounding box list 312, a transfer matrix buffer 314, a display controller 316, subframes 320*a* . . . *n* and a waveform lookup table 322 that includes waveforms 318. The compositor 310 receives the ink bitmap 920, interacts with the bounding box list producer 311 which adds the corresponding rectangle regions to a bounding box list 312 and adds information about a current image and a next image to the transfer matrix buffer 314. In one embodiment, the rectangle region is any size between a single pixel and the full size of the electrophoretic display 110. The display controller 316 retrieves the waveforms 318 from the waveform lookup table 322. The waveforms 318 include voltage value sequences for driving the electrophoretic display 110. The display controller 316 receives bounding boxes from the bounding box list 312 and transition matrices from the transfer matrix buffer 314. The display controller 316 produces subframes 320 from bounding boxes, transition matrices and waveforms 318 and sends the produced subframes 320 to the subframe buffer.

In one embodiment, the compositor 310 receives ink bitmap from a pen drawing system 900. The compositor 310 generates one or more transition matrices from the ink bitmap 920 received from the display manager 308. The transition matrices include information about a current image and a next image where each byte includes four upper bits and four lower bits representing the next value and the current value in the range of 16 gray levels for each corresponding pixel. The transfer matrix buffer 314 comprises a first buffer and a second buffer for storing one or more transition matrices. The compositor 310 constructs one or more transition matrices in the first buffer and the second buffer of the transfer matrix buffer 314. In some embodiments, the first buffer is used as a reference buffer for storing data to be used by the next display update. The compositor 310 interacts with the bounding box list producer to 311 generate and update the bounding box list 312.

In one embodiment, the bounding box list producer 311 minimizes mutual exclusion between one or more threads that produce one or more bounding boxes and a thread that consumes the one or more bounding boxes. The bounding box list producer 311 processes the bounding boxes while holding a data lock to prevent other threads from manipulating the data, transfers the data without a lock and adds the new rectangle regions to the bounding box list 312 while holding the lock. In another embodiment, the bounding box list producer 311 produces bounding boxes by using temporal clipping between a new bounding box and an existing bounding box in the bounding box list 312.

In another embodiment, the compositor 310 and the bounding box list producer 311 use either the first buffer or the second buffer of the transfer matrix buffer 314 as the reference buffer. This avoids an extra data copy a majority of the time. For example, there are three possible scenarios for processing updates. First scenario: the compositor 310 and the bounding box list producer 311 transfer the new display request for a region to the primary bounding box list, the compositor 310 and the bounding box list producer 311 use the reference buffer for the display request data. Second scenario: the compositor 310 and the bounding box list producer 311 send the new update request to a shadow bounding box list and send the display request data to the reference buffer. Third scenario: the compositor 310 and the bounding box list producer 311 send the new update request to a shadow list and send display request data to the second buffer. In one embodiment, the compositor 310 and the bounding box list producer 311 copy display request data to the reference buffer when there is a first shadow region for that primary region. In another embodiment, the compositor 310 and the bounding box list producer 311 copy display request data to the reference buffer when the update of the region is finished. In the latter case, the display controller 316 adds the finished region to a delayed flush queue. The compositor 310 and the bounding box list producer 311 then process the delayed flush queue by copying the display request data to the reference buffer.

The transfer matrix buffer 314 stores one or more transition matrices. The transition matrices include transition matrix pixels corresponding to pixels on the electrophoretic display 110. The display controller 316 receives various transition matrix pixels of the transition matrices with indices to waveforms 318 from the waveform lookup table 322 required for driving the corresponding display pixels on the electrophoretic display 110 to their desired color. The display driving system 106 outputs the subframes 320 including the indexed waveform data to the subframe buffer, which is accessed by the display interface 108. The subframes 320 are applied to the corresponding display pixel on the electrophoretic display 110 by the display interface 108 to drive the display pixel to its desired color.

The waveforms 318 are stored in a waveform lookup table 322. The waveform lookup table 322 is an indexed storage for waveforms 318 that are required to drive the display pixels on the electrophoretic display 110. In one embodiment, the waveform lookup table 322 is divided into a plurality of time periods represented by subframes 320. A subframe includes a part of the waveform required to drive the display pixel to a desired color. In one embodiment, the waveform lookup table 322 includes waveforms for a subframe sequence. The waveforms 318 include voltage value sequences that will be applied to the electrophoretic display 110. In one embodiment, the waveform lookup table 322 comprises voltage values that are applied to the electrophoretic display 110.

The display controller 316 receives bounding boxes from the bounding box list producer 311, transition matrices from the transfer matrix buffer 314 and waveforms 318 from the waveform lookup table 322. The display controller 316 generates a subframe sequence from one or more bounding boxes from the bounding box list 312, one or more transition matrices from the transfer matrix buffer 314 and waveforms 318 from the waveform lookup table 322. The display controller 316 provides the subframe sequence to control one or more pixels on the electrophoretic display 110.

Method for Computing Intersections Between Convex Polygon and Cell Grid

Figure 10:
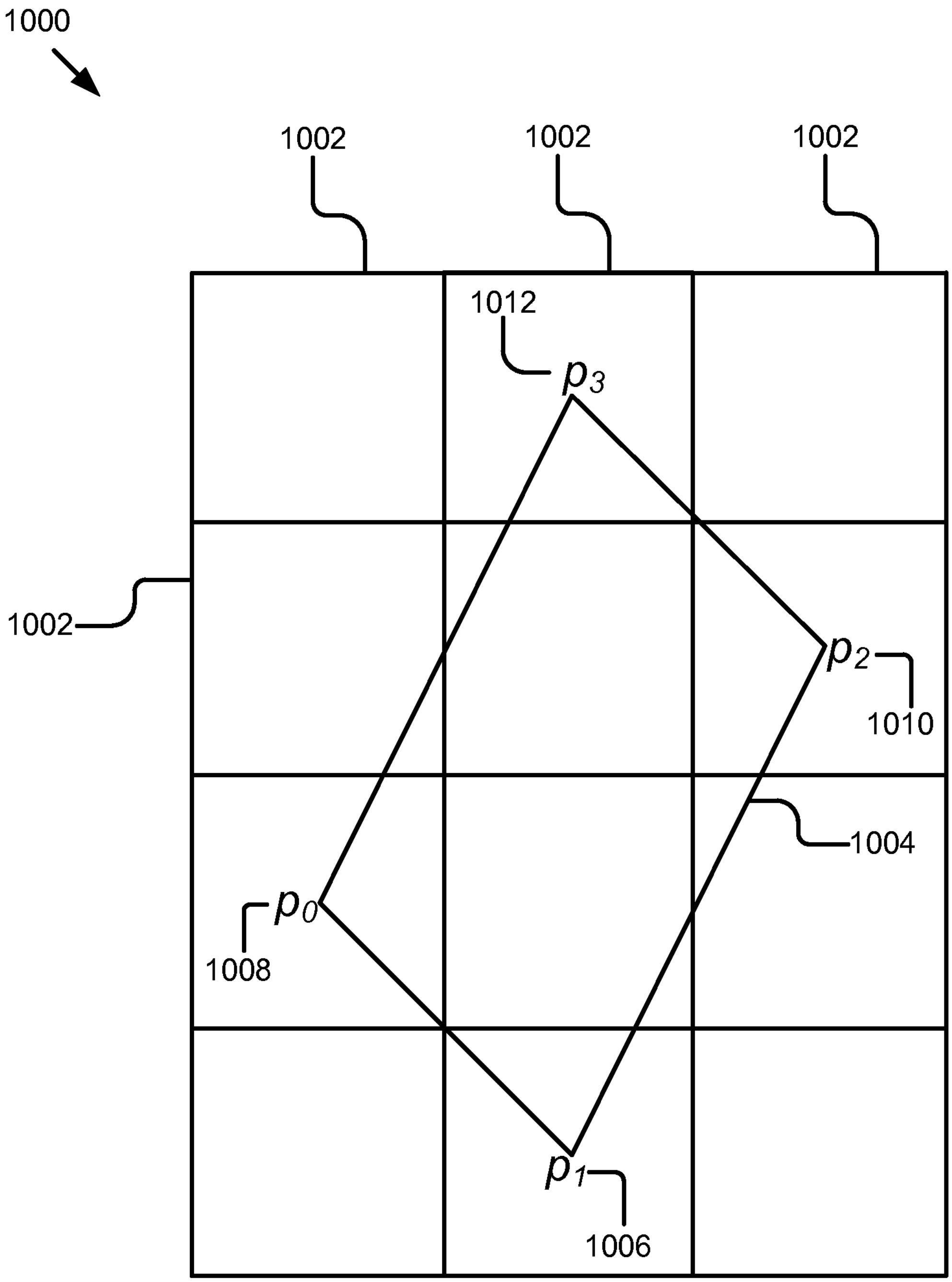
FIG. 10 is a graphical representation of one example of a convex quadrilateral that intersects with a cell grid.

FIG. 10 is a graphical representation 1000 of one embodiment of a convex polygon intersecting with a cell grid. The grid comprises one or more cells 1002. A convex polygon 1004 intersects with some of the cells 1002. In this example, the convex polygon 1004 includes four vertices p1 1006, p0 1008, p2 1010 and p3 1012.

One embodiment of a method for computing intersections of a convex polygon and one or more grid cells will be described. In one embodiment, the grid cells form a grid that is rectangular or non-rectangular. The dimension of the grid can be variable in different cells. The method selects an initial vertex on the convex polygon, scans simultaneously along opposite sides of the convex polygon, records grid cells lying in between the opposite sides along one dimension and ends at a vertex opposite to the initial vertex. In one embodiment, the convex polygon is a quadrilateral. In another embodiment, the method modifies the display information of the recorded grid cells lying in between the opposite sides. In one embodiment, the convex polygon is scanned with a left state machine and a right state machine. The left state machine and the right state machine determines if either has reached a vertex of the convex polygon. For example, the left state machine reaches another vertex and as a result, changes the direction of the scanning. The left state machine and the right state machine will be explained in more detail with reference to FIGS. 12A-12B. In another embodiment, the left state machine and the right state machine scan the polygon simultaneously. For example, after the left state machine moves upward while scanning, the left state machine waits until the right state machine has moved up.

Figure 11:
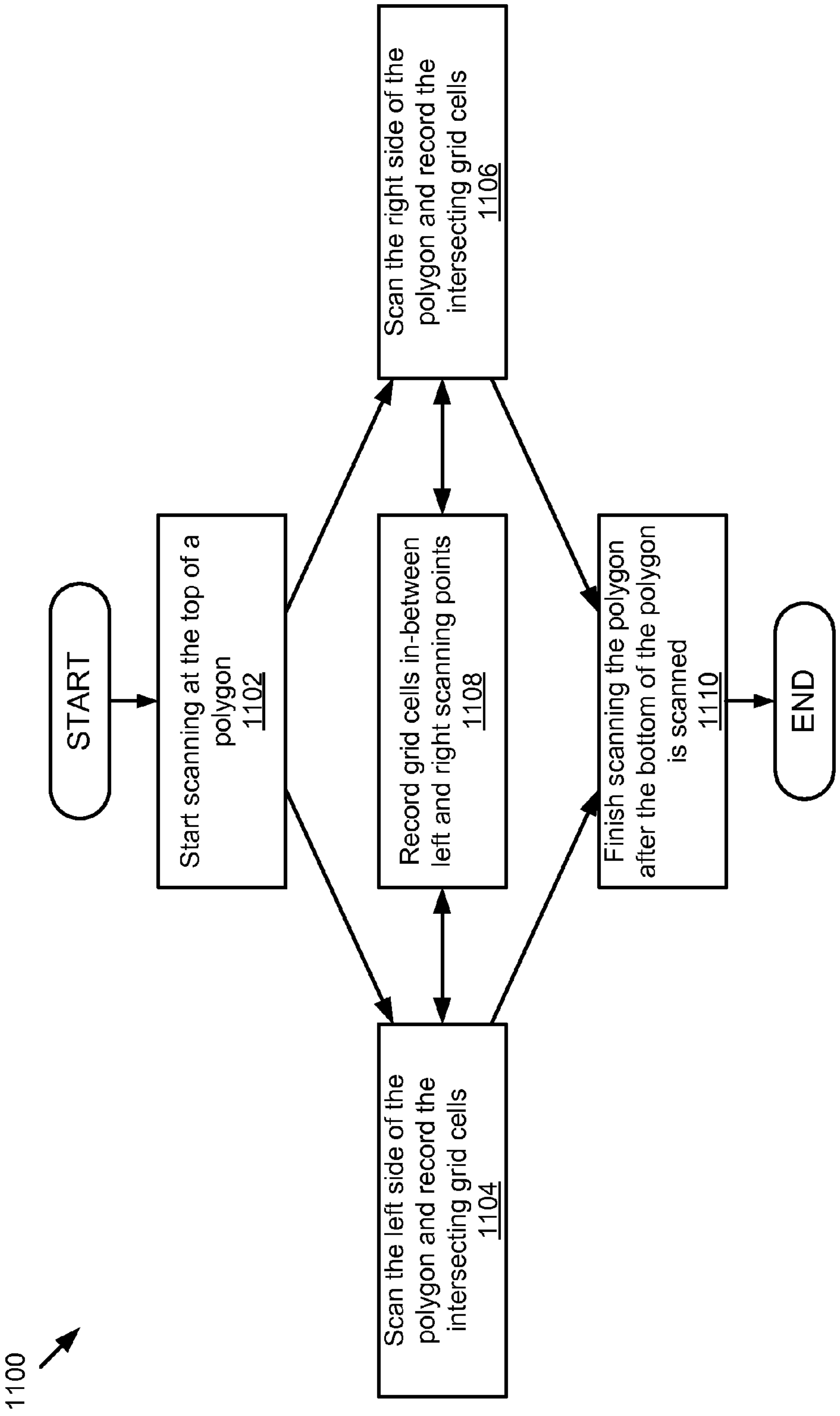
FIG. 11 is a flow chart of one embodiment of a method for calculating intersections between a cell grid and a polygon.

FIG. 11 is a high-level flow chart of one embodiment of a method 1100 for scanning a polygon to determine intersections of polygon with grid cells. The method 1100 starts 1102 scanning at the top of the polygon. The method 1100 selects a vertex and scans 1104, 1106 simultaneously along the opposite sides of the polygon towards the vertex opposite to the initial one. One example of such a scanning method is described below with reference to FIGS. 12A and 12B. While scanning, the method 1100 records 1104, 1106 cells on both sides of the polygon and in between the left and right scanning points 1108. One example of such a scanning method is described below with reference to FIGS. 12A and 12B. After the method 1100 reaches the bottom vertex of the polygon, it finishes 1110 scanning the polygon. In one embodiment, the method 1100 starts scanning at the bottom of the polygon and finishes at the top of the polygon. A person of ordinary skill in the art will recognize that the display module can start scanning at any point on the polygon and end at the point opposite to the starting point. The method for scanning a polygon is explained in more detail below.

Figure 12A:
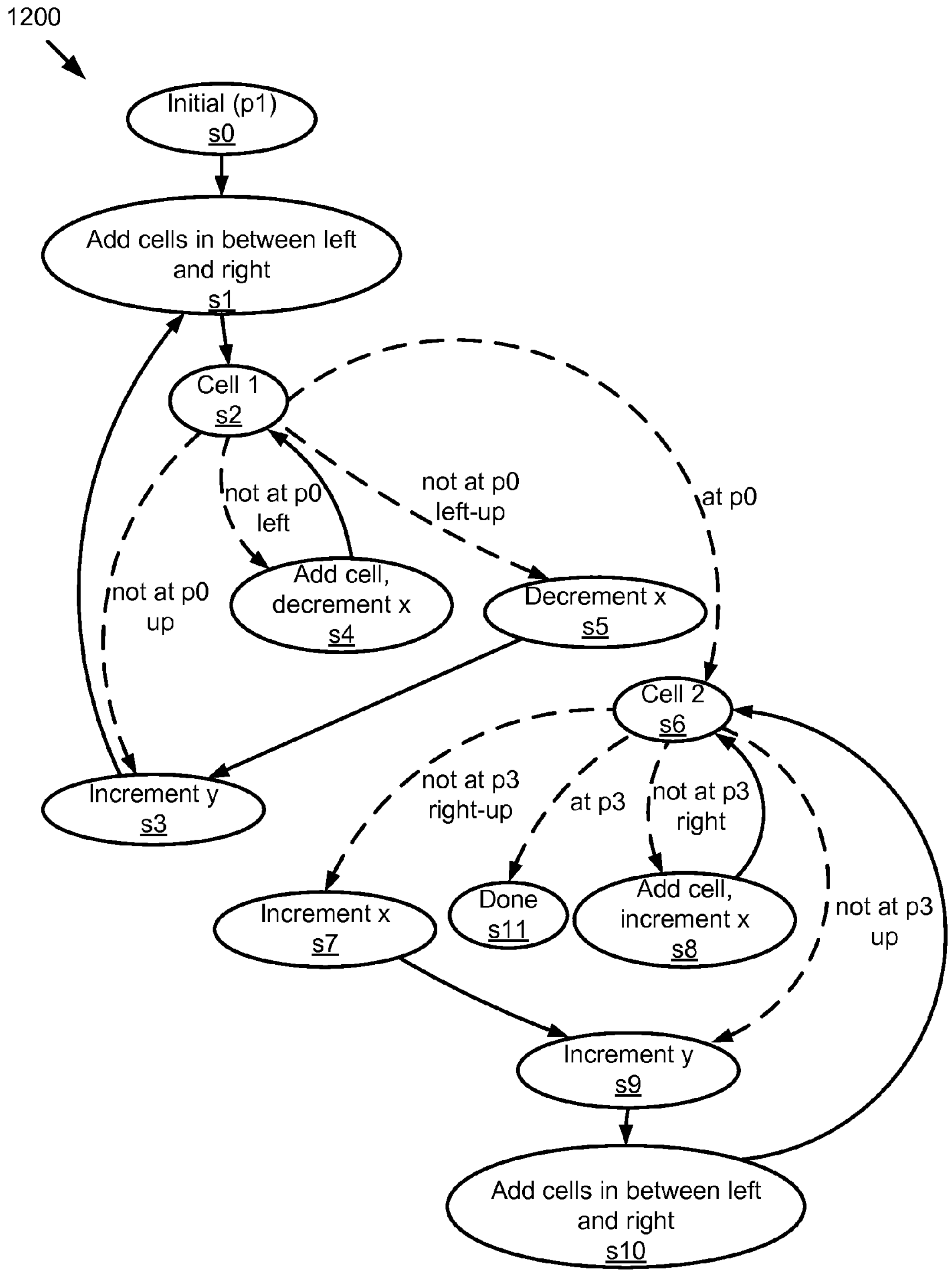
FIG. 12A is a state diagram of one example of a left walk state machine.

FIG. 12A is a state diagram of one embodiment of a method 1200 for scanning along the left side of a convex polygon. In this example, a left scanning position comprises x and y coordinates corresponding to a cell 1002 on the grid. In one embodiment, the left state machine begins at s0 on vertex p1 1006 and proceeds towards vertex p0 1008. Initially, together with the right state machine, the left state machine 1200 records s1 the cells between the left scanning position and the right scanning position in a temporary list. The right state machine will be explained in more detail below. The left state machine enters state s2 and then determines the cell it needs to enter at the next step. If the next cell to enter is above the current scanning position, then the state machine increments s3 the current position's y coordinate, enters state s1, and records the cells between the left position and the right position in the temporary list. Whenever the left state machine increments the current position's y coordinate, it waits for the right state machine to do the same. If the next cell to enter is to the left of the current position, then the state machine decrements s4 the current position's x coordinate, adds the entered cell to the temporary list and returns to state s2. If the next cell to enter is above and to the left of the current position, then the state machine decrements s5 the current position's x coordinate, increments s3 the current position's y coordinate and enters state.

If the left state machine has reached p0 1008, it enters state s6 and proceeds to vertex p3 1012. If the next cell to enter is above the current position, then the state machine increments s9 the current position's y coordinate and proceeds to state s10. At state s10, the left state machine records the cells between the left position and the right position and then returns to state s6. If the next cell to enter is to the right of the current position, then the state machine increments s8 the current position's x coordinate, records the entered cell and returns to state s6. If the next cell to enter is above and to the right of the current position, then the state machine increments s7 the current position's x coordinate, increments s9 the current positions' y coordinate, returns to state s10, and records the cells between the left position and the right position. If the state machine has reached p3 1012, it terminates s11.

Figure 12B:
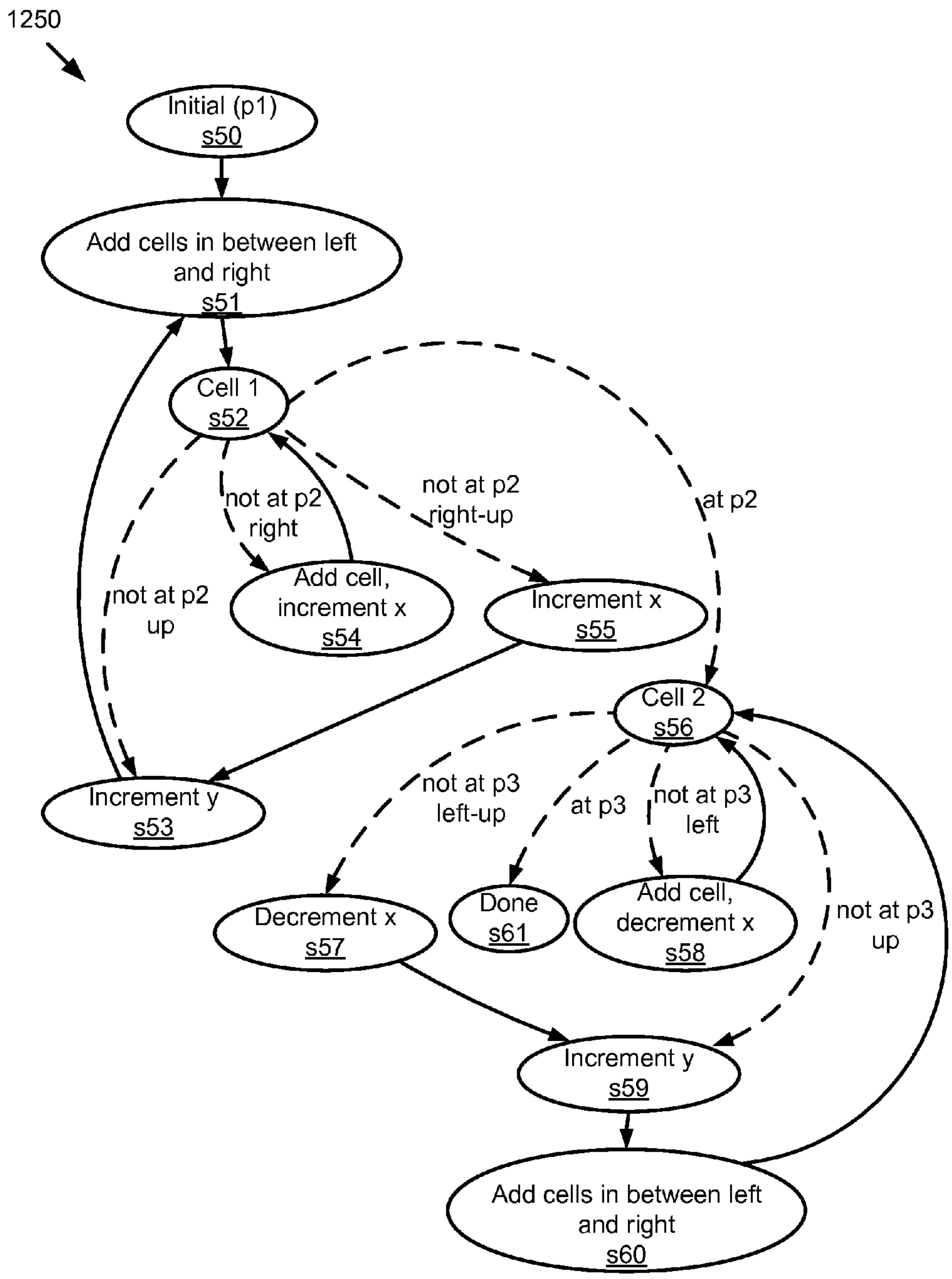
FIG. 12B is a state diagram of one example of a right walk state machine.

FIG. 12B is a state diagram of one embodiment of a method 1250 for scanning along the right side of a convex polygon. In this example, a right scanning position comprises x and y coordinates corresponding to a cell 1002 on the grid. In one embodiment, the right state machine starts at s50 on vertex p1 1006 and proceeds towards vertex p2. Initially, together with the left state machine, the right state machine 1250 records the cells between the left scanning position and the right scanning position. The state machine enters state s51 and then determines the cell it needs to enter at the next step. If the next cell to enter is above the current scanning position, then the state machine increments s53 the current position's y coordinate and returns to state s51 to record the cells between the left scanning position and the right scanning position t. Whenever the right state machine increments the current position's y coordinate, it waits for the left state machine to do the same. If the next cell to enter is to the right of the current position, then the state machine increments s54 the current position's x coordinate, records the entered cell and returns to state s52. If the next cell to enter is above and to the right of the current position, then the state machine increments s55 the current position's x coordinate, increments s53 the current position's y coordinate and returns to state s51.

If the right state machine has reached vertex p2 1010, it enters s56 and proceeds towards p3 1012. If the next cell to enter is above the current position, then the state machine increments s59 the current position's y coordinate, proceeds to state s60. At state s60, together with the left state machine, the right state machine records the cells between the left scanning position and the right scanning position, and then returns to state s56. If the next cell to enter is to the left of the current position, then the state machine decrements s58 the current position's x coordinate, records the entered cell and returns to state s56. If the next cell to enter is above and to the left of the current position, then the state machine decrements s57 the current position's x coordinate, increments s59 the current position's y coordinate, returns to state s60 and records the cells between the left position and the right position. If the right state machine has reached p3 1012, it then terminates.

The foregoing description of the embodiments of the present embodiment of invention has been presented for the purposes of illustration and description. It is not intended to be exhaustive or to limit the present embodiment of invention to the precise form disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or formats. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the specification of the present embodiment of invention is intended to be illustrative, but not limiting, of the scope of the present embodiment of invention, which is set forth in the following claims.

What is claimed is:

1. A method for controlling an electrophoretic display, the method comprising:
- receiving one or more display requests;
- transforming the one or more display requests into one or more bounding boxes;
- generating one or more transition matrices from the one or more display requests;
- generating a subframe sequence from the one or more bounding boxes and the one or more transition matrices; and
- providing the subframe sequence to control one or more pixels on the electrophoretic display.

2. The method of claim 1, wherein a first buffer and a second buffer are used for storing the one or more transition matrices.

3. The method of claim 2, wherein the first buffer is used as a reference buffer.

4. The method of claim 1, further comprising minimizing mutual exclusion between one or more threads that produce the one or more bounding boxes and a thread that consumes the one or more bounding boxes.

5. The method of claim 2, wherein the one or more display requests for the one or more pixels under transition are collapsed into one of the first buffer and the second buffer.

6. The method of claim 1, wherein the one or more bounding boxes include a variable describing a current state of transition for contained pixels.

7. The method of claim 1, wherein the one or more bounding boxes are produced by temporal clipping between a new bounding box and an existing bounding box.

8. A system for controlling an electrophoretic display, the system comprising:
- a processor;
- a display manager for receiving one or more display requests and for transforming the one or more display requests into one or more bounding boxes, image data and at least one pen stroke, the display manager coupled to the processor, coupled to receive the one or more display requests and coupled to output the one or more bounding boxes;
- a compositor coupled to the display manager to receive the image data, the compositor for generating one or more transition matrices from the image data;

a bounding box list producer coupled to receive the one or more display requests, the bounding box list producer generating a bounding box list of non-overlapping bounding boxes; and a display controller coupled to the compositor to receive the one or more transition matrices and coupled to receive the bounding box list, the display controller generating a subframe sequence from the bounding box list and the one or more transition matrices and providing the subframe sequence to control one or more pixels on the electrophoretic display.

9. The system of claim 8, further comprising a touch sensor for pen tracking and erasing the one or more pixels on the electrophoretic display.

10. The system of claim 8, further comprising a transfer matrix buffer comprising a first buffer and a second buffer for storing the one or more transition matrices.

11. The system of claim 8, further comprising a waveform lookup table comprising voltage values that are applied to the electrophoretic display.

12. The system of claim 8, wherein the bounding box list producer minimizes mutual exclusion between one or more threads that produce the one or more bounding boxes and a thread that consumes the one or more bounding boxes.

13. The system of claim 8, further comprising three display buffers for storing the subframe sequence.

14. The system of claim 8, wherein the bounding box list producer produces the one or more bounding boxes by temporal clipping between a new bounding box and an existing bounding box.

15. A method for computing intersections of a convex polygon and one or more grid cells, the method comprising:

selecting an initial vertex of the convex polygon;

scanning along opposite sides of the convex polygon;

recording grid cells lying between opposing sides along one dimension; and ending at another vertex of the convex polygon.

16. The method of claim 15, wherein the one or more grid cells form a grid that is rectangular.

17. The method of claim 15, wherein the one or more grid cells form a grid that is non-rectangular.

18. The method of claim 16, wherein a dimension of the grid can be variable in different grid cells.

19. The method of claim 15, further comprising scanning the convex polygon with a left state machine and a right state machine.

20. The method of claim 19, wherein scanning the convex polygon is performed simultaneously by the left state machine and the right state machine.

* * * * *